United States Patent
Underwood et al.

(10) Patent No.: US 11,456,972 B2
(45) Date of Patent: Sep. 27, 2022

(54) METHODS AND ARRANGEMENTS TO ACCELERATE ARRAY SEARCHES

(71) Applicant: INTEL CORPORATION, Santa Clara, CA (US)

(72) Inventors: Keith Underwood, Powell, TN (US); Karl Brummel, Chicago, IL (US); John Greth, Hudson, MA (US)

(73) Assignee: INTEL CORPORATION, Santa Clara, CA (US)

( * ) Notice: Subject to any disclaimer, the term of this patent is extended or adjusted under 35 U.S.C. 154(b) by 566 days.

(21) Appl. No.: 15/941,381

(22) Filed: Mar. 30, 2018

(65) Prior Publication Data

US 2019/0044890 A1 Feb. 7, 2019

(51) Int. Cl.
| | |
|---|---|
| *H04L 49/901* | (2022.01) |
| *H04L 45/745* | (2022.01) |
| *H04L 49/35* | (2022.01) |
| *H04L 67/568* | (2022.01) |
| *H04L 49/9047* | (2022.01) |
| *H04L 69/04* | (2022.01) |

(52) U.S. Cl.
CPC .......... *H04L 49/901* (2013.01); *H04L 45/745* (2013.01); *H04L 49/355* (2013.01); *H04L 67/568* (2022.05); *H04L 49/9047* (2013.01); *H04L 69/04* (2013.01)

(58) Field of Classification Search
CPC ... H04L 49/901; H04L 49/355; H04L 45/745; H04L 67/2842; H04L 69/04; H04L 49/9047
USPC ......................................................... 370/412
See application file for complete search history.

(56) References Cited

U.S. PATENT DOCUMENTS

| | | | |
|---|---|---|---|
| 2010/0095064 A1* | 4/2010 | Aviles | H04L 67/1097 711/118 |
| 2014/0115182 A1* | 4/2014 | Sabaa | H04L 67/1097 709/232 |
| 2018/0359324 A1* | 12/2018 | Harlamert, II | H04L 67/22 |
| 2019/0149472 A1* | 5/2019 | Singh | H04L 45/7453 |

* cited by examiner

*Primary Examiner* — Hassan A Phillips
*Assistant Examiner* — Mohammed S Chowdhury
(74) *Attorney, Agent, or Firm* — KDB Firm PLLC

(57) ABSTRACT

Logic may store at least a portion of an incoming packet at a memory location in a host device in response to a communication from the host device. Logic may compare the incoming packet to a digest in an entry of a primary array. When the incoming packet matches the digest, logic may retrieve a full entry from the secondary array and compare the full entry with the first incoming packet. When the full entry matches the first incoming packet, logic may store at least a portion of the first incoming packet at the memory location. And, in the absence of a match between the first incoming packet and the digest or full entry, logic may compare the first incoming packet to subsequent entries in the primary array to identify a full entry in the secondary array that matches the first incoming packet.

25 Claims, 11 Drawing Sheets

FIG. 8

| WALK LENGTH (Number of entries traversed in primary array) | DIRECT MAPPED CACHE (average number of cycles of latency based on walk length) | DIGEST EFFICIENCY (average number of cycles of latency based on walk length and the efficiency of the determined digest stored in the primary array) | | | | | |
|---|---|---|---|---|---|---|---|
| | | 50% | 60% | 70% | 80% | 90% | |
| 1 | 7.0 | 10.0 | 10.0 | 10.0 | 10.0 | 10.0 | |
| 2 | 14.0 | 16.5 | 15.8 | 15.1 | 14.4 | 13.7 | |
| 3 | 21.0 | 23.0 | 21.6 | 20.2 | 18.8 | 17.4 | |
| 4 | 28.0 | 29.5 | 27.4 | 25.3 | 23.2 | 21.1 | |
| 5 | 35.0 | 36.0 | 33.2 | 30.4 | 27.6 | 24.8 | |
| 6 | 42.0 | 42.5 | 39.0 | 35.5 | 32.0 | 28.5 | |
| 7 | 49.0 | 49.0 | 44.8 | 40.6 | 36.4 | 32.2 | |

800

METHODS AND ARRANGEMENTS TO ACCELERATE ARRAY SEARCHES

GOVERNMENT RIGHTS

This invention was made with Government support under contract number H98230-13-D-0124-0134, awarded by the Department of Defense. The Government has certain rights in this invention.

TECHNICAL FIELD

Embodiments described herein are generally directed to communication between nodes of a multi-node network, and more particularly, to an end-point protocol to store the incoming packets, or a portion thereof, at a memory location provided by a host device.

BACKGROUND

In order to exchange messages with each other, applications running on different computing devices in a communication network may make use of application-layer connectivity provided by a connectivity fabric of that communication network. At the transport layer, an initiator device may segment a message being sent from the initiator device to a target device and may include the segments in packets for transmission to the target device during a packet transfer process. If multiple devices send messages to a target device, multiple packet transfer processes may concurrently pend at the target device and will traverse a network interface of the target device such as a network interface card (NIC) from the physical layer through the data link layer and the transport layer to an application, in the application layer, executing on a host device of the target device.

BRIEF DESCRIPTION OF THE DRAWINGS

FIG. 8 depicts an embodiment of a table to illustrate data that compares an embodiment of the end-point protocol described herein versus an embodiment of a direct-mapped cache to map incoming packets to memory locations in a host device such the end-point protocol shown in FIGS. 1-7;

DETAILED DESCRIPTION I/F EMBODIMENTS

Figure 1:
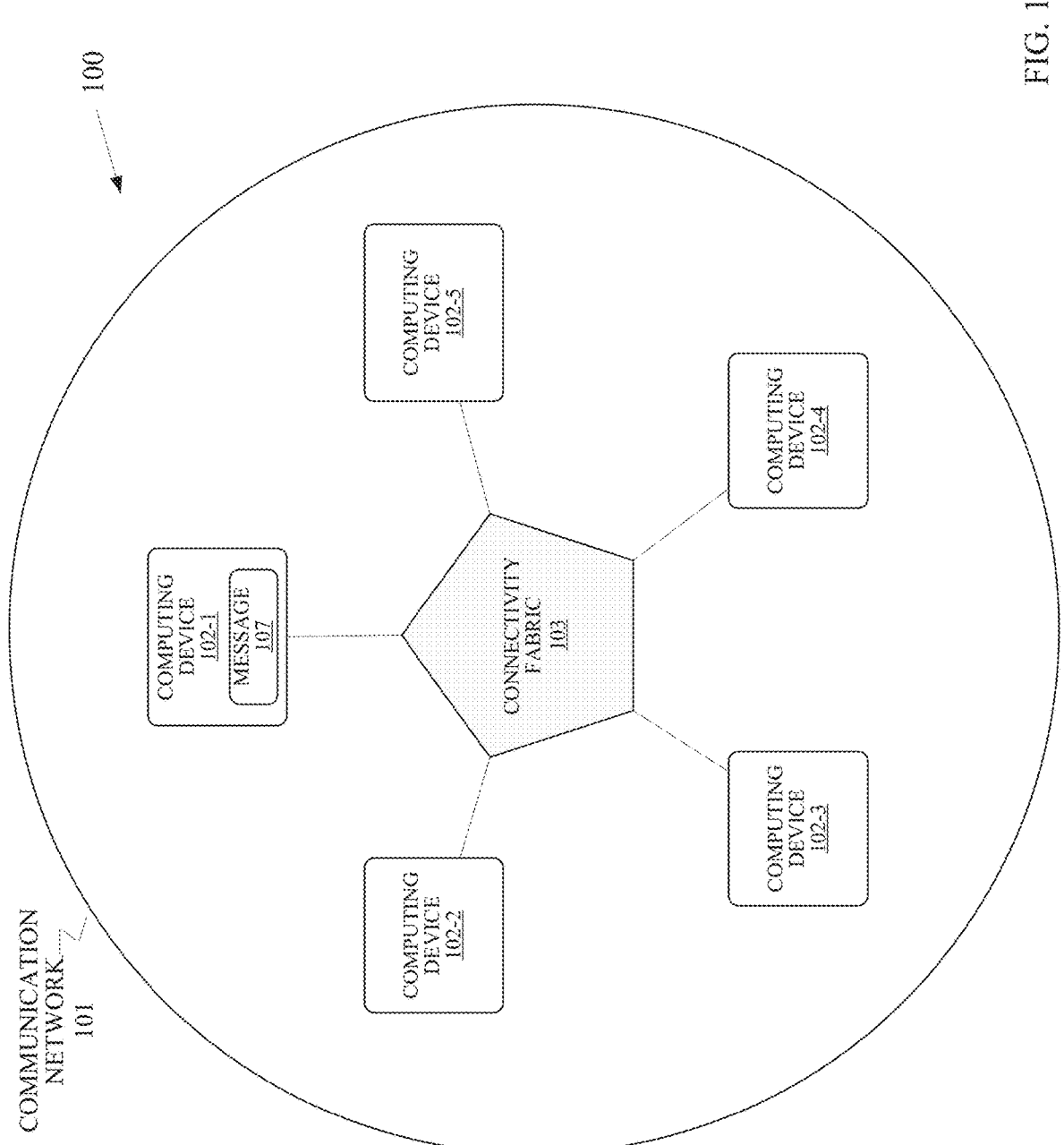
FIG. 1 depicts an embodiment of a system including multiple computing devices interconnected with a communication network.

The following is a detailed description of embodiments depicted in the drawings. The detailed description covers all modifications, equivalents, and alternatives falling within the appended claims.

Networks typically interconnect host devices, switches, and storage devices to communicate and share data. Host devices may be general-purpose computers or specific purpose computers and may include a network interface. While network interfaces can be integrated with host devices, the network interfaces may also reside on a modular card, which is referred to as a network interface card (NIC).

NICs typically include network ports as well as a transmit and receive buffers to transmit and receive packets. The transmit and receive buffers typically store or buffer incoming and outgoing messages, respectively. The outgoing messages may await in a queue for preparation for transmission via data link layer and physical layer (PHY) logic circuitry in the transmit port(s). The incoming packets may arrive via data link layer and physical layer (PHY) logic circuitry in the receive port(s) and wait for an end-point protocol to match the incoming packet with a memory location provided by a software application executing on a host device.

Some fabric architectures store buffer entries in linked lists to honor programming model semantics a network programming interface such as described by the specification, The Portals 4.0.2 Network Programming Interface, Sandia National Laboratories, October 2014. Fabric architectures refer to communication networks that implement connectivity fiber such as InfiniB and (IB), Fibre Channel, and Omni-Path architectures.

The Portals network programming interface describes communication between nodes in a system area network. Portals provides the building blocks to create a diverse set of scalable, high performance application programming interfaces and language support run-times for High Performance Computing (HPC) systems. Portals provides one-sided data movement operations, but unlike other one-sided programming interfaces, the target of a remote operation is not a virtual address. Instead, the target determines the destination in memory for an incoming message by comparing contents of the message header with the contents of structures at the target. This flexibility allows for efficient implementations of both one-sided and two-sided communications. In particular, Portals provides the fundamental operations to support a high-performance and scalable implementation of A Message Passing Interface (MPI) Standard, v3.0, Message Passing Interface Forum, University of Tennessee, Knoxville, Tenn., Sep. 21, 2012. For instance, the Portals application programming interface (API) may support a machine with two million or more cores.

The host device may execute a software application such as a Portals API that communicates memory locations for expected incoming packets with a NIC such as a Host Fabric Interface (HFI) or a Host Channel Adapter (HCA). The communications may include data to identify the incoming packet and a memory location at which to store at least a portion of the incoming packet. The NIC may store the data and memory location for each communication in buffer entries. Buffer entries are typically appended to the end of the list by host software and removed essentially randomly by arriving packets.

Various embodiments may be designed to address different technical problems associated with matching the buffer entries with incoming packets. Due to the size of the buffer entries (e.g., >=64 bytes) and the number of buffer entries (e.g., 16M (16 million) or more), it is impractical to store all the buffer entries in memory on the NIC. To illustrate, suppose an implementation caches 32K (32 thousand) buffer entries, which requires roughly 2 megabytes (MB) total storage with an access time of seven cycles. Because the structures are large, it is not practical to build a set associative cache: the cost to access several entries in parallel and then selecting the correct one is too high in terms of power, wiring, etc. Due to the pointer chasing, the serial nature of searching linked lists, the latency cost of the data lookup in series with a set associative tag lookup is also undesirable.

In general, embodiments may comprise search acceleration logic circuitry on a network interface, such as a NIC, to match incoming packets with arrays of entries that describe incoming packets and the memory locations at which to store data from the incoming packets. More specifically, embodiments may store an entry with a tag and some metadata in a primary array and a full entry with full matching criteria, or data, and a memory location for a buffer entry in a secondary array. Considering the cache is designed specifically to operate on linked lists, in some embodiments, the primary array may store the tag, the next pointer, and a subset of the matching criteria in the entry of the primary array. This subset of the matching criteria is a "digest" of the full matching criteria. In some embodiment, the digest may be more than just a subset of the full matching criteria and may include, for instance, combined portions of the full matching criteria to compress some of the bits in the full matching criteria. The full matching criteria may be impractical to store in the primary array because of the size (~32 bytes).

The entries in the primary array, which include the digest rather than the full matching criteria, are sufficiently small that it is practical to implement them in a set associative manner. In some embodiments, tag match logic circuitry may perform a matching function for more than one incoming packet in parallel or concurrently. In some embodiments, the tag match logic circuitry may perform a matching function in parallel via use of more than one primary array, other embodiments stagger access to the primary array by the concurrent matching functions, further embodiments support simultaneous access of the primary array, and some embodiments compare each digest to more than one incoming packet with a single read of the digest from the primary array. For instance, the tag match logic circuitry may query the digests in parallel, compare multiple incoming packets with the digests in parallel, and the digests may filter out entries that will not match. In the case that the entry hits in the cache but is not the sought entry (i.e., the digest indicates the full entry will not match), the full entry is not retrieved from the data store but instead the tag match logic circuitry may fetch the next entry in the list. If the digest matches, the tag match logic circuitry may retrieve the full entry and check the full entry for a match. If the full entry matches, the walk is complete, else the process continues to the next element in the list. Thus, the average latency of a lookup is the tag latency plus the data latency times the probability of a data lookup, which relates to the efficiency of the digest.

Different technical problems such as those discussed above may be addressed by one or more different embodiments. Embodiments may address one or more of these problems leading to faster search times for many cases combined with a higher hit rate than direct mapped caches allow. For instance, some embodiments that address problems associated with matching the buffer entries with incoming packets may do so by one or more different technical means, such as, receiving communications from a host device to associate incoming packets with memory locations; generating a digest based data included in each of the communications; storing entries for the communications in a primary array, each entry in the primary array comprising a tag and a digest; storing the entries in the primary array in a linked list data structure; and storing full entries for the communications in a secondary array, each full entry in the secondary array comprising the data included in the communication from the host device to identify one of the incoming packets and a memory location that is associated with the one of the incoming packets. Further embodiments may address one or more of the problems by comparing a first incoming packet of the incoming packets to a digest of a first entry in the primary array to determine whether the first incoming packet matches the digest of the first entry; comparing more than one incoming packets with one or more digests in parallel or concurrently; if the first incoming packet matches the digest of the first entry in the primary array, retrieving a first full entry from the secondary array via a tag of the first entry in the primary array and comparing the first full entry with the first incoming packet and other incoming packets in parallel or concurrently; and if the first full entry matches the first incoming packet, storing at least a portion of the first incoming packet at the first memory location. Several embodiments may address one or more of the problems by, in the absence of a match between the first incoming packet and the first digest or the first full entry, comparing the first incoming packet to subsequent entries in the primary array of entries and the secondary array of entries to identify a full entry in the secondary array of entries that matches the first incoming packet, and removing an entry from the primary array after determining that the entry matches one of the incoming packets, and the like.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, cameras, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, drones, and the like), and the like.

FIG. 1 illustrates an example of an operating environment 100 that may be representative of various embodiments. In operating environment 100, a communication network 101 comprises a plurality of computing devices 102-1 to 102-5. In some embodiments, a connectivity fabric 103 of communication network 101 may enable communication among the computing devices 102-1 to 102-5. In various embodiments, in the context of the application layer, the connectivity fabric 103 may enable the use of application-layer send operations to send messages for receipt via application-layer receive operations. In the example of FIG. 1, the computing device 102-1 may use a send operation to send a message 107 to the computing device 102-5 via connectivity fabric 103, and the computing device 102-5 may use a receive operation to receive the message 107 from computing device 102-1 via connectivity fabric 103. Note that in other embodiments, the computing device 102-1 may connect directly to the computing device 102-5 via the connectivity fabric 103.

An application layer software executing on the computing device 102-5 such as a Portals application programing interface (API), may communicate with a network interface such as a network interface card (NIC). With one or more communications, the application layer software may communicate full matching criteria, or data, to identify each of one or more incoming packets that encompass the message 107. The NIC may generate a digest for each set of full matching criteria and store a tag and the digest in entries for each of the incoming packets that encompass a portion of the message 107 in a primary array. The NIC may also store the full matching criteria in full entries in a secondary array along with a memory location for each entry.

In some embodiments, the NIC comprises cache to store the primary and the secondary array. In several embodiments, the numbers of incoming packets may exceed the number of available full entries in the secondary array and so embodiments may store the remainder of the full entries in a backing store, which is a memory location that typically takes longer to access than the cache comprising the secondary array. In other embodiments, part of the secondary array may reside in a backing store on the host device of the computing device 102-5. In further embodiments, the entire secondary array may be in the backing store.

Figures 2, 3:
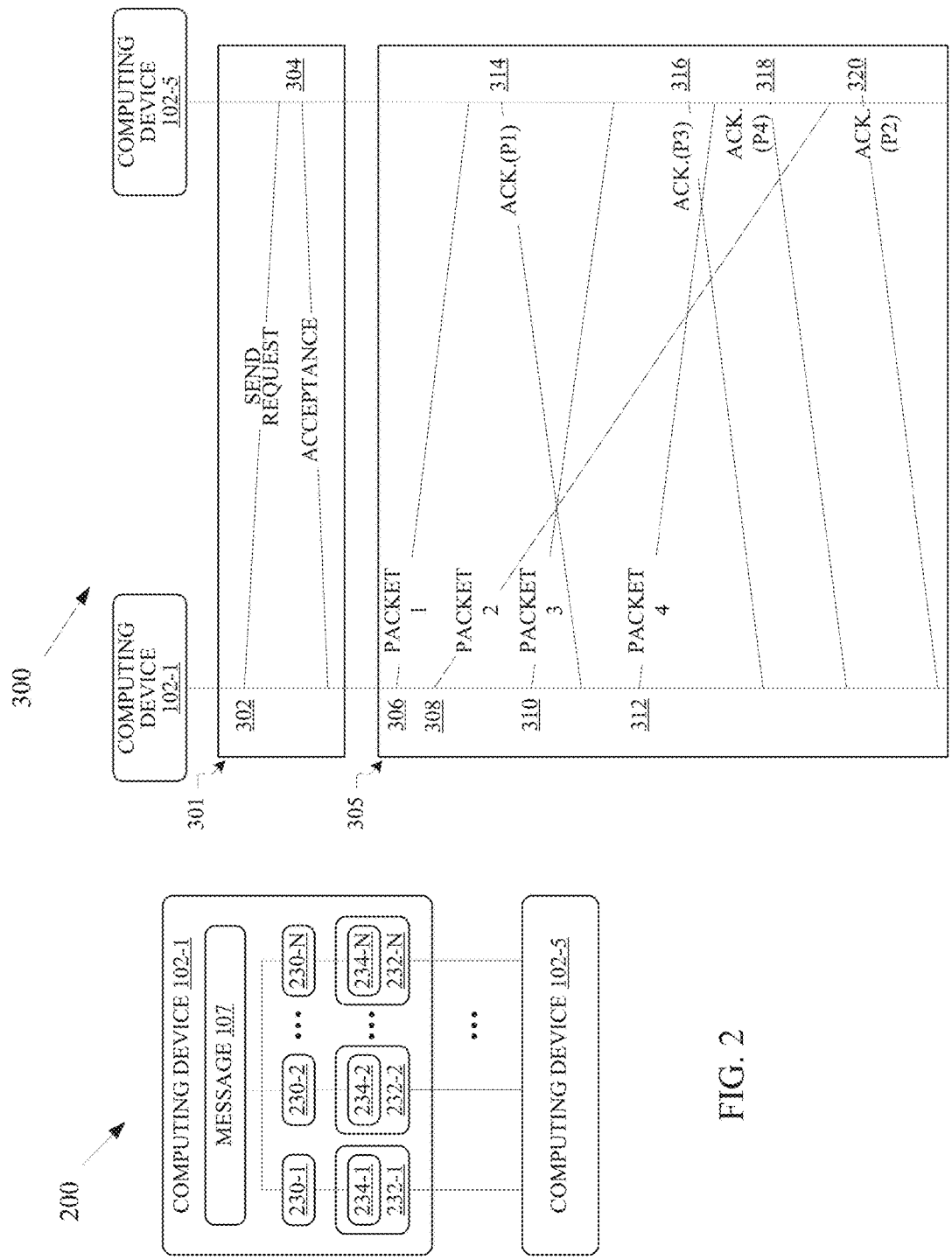
FIGS. 2-3 depict embodiments to illustrate a more detailed computing device for transmitting or receiving a message and a communication flow for transmitting the message from an application layer through a communication network to a target device, such as the communication network illustrated in FIG. 1.

FIG. 2 illustrates an example of an operating environment 200 that may be representative of the computing device 102-1 or the computing device 102-5. In operating environment 200, to send the message 107 to the computing device 102-5, the computing device 102-1 may partition some or all of message 107 into a plurality of data segments 230-1 to 230-N, where N is an integer greater than 1. In various embodiments, the computing device 102-1 may then send each one of the plurality of data segments 230-1 to 230-N to the computing device 102-5 in a separate respective one of packets 232-1 to 232-N. In some embodiments, each one of packets 232-1 to 232-N may comprise a respective one of payloads 234-1 to 234-N, each of which may contain the data segment to transmit in its associated packet. In various embodiments, the computing device 102-5 may receive packets 232-1 to 232-N, extract data segments 230-1 to 230-N from respective payloads 234-1 to 234-N, and reconstruct the message 107 using data segments 230-1 to 230-N.

The computing device 102-5 may reconstruct the message 107 by storing each of the data segments 230-1 to 230-N at memory locations identified in communications from the host device of the computing device 102-5 to a network interface of the computing device 102-5. In many embodiments, the network interface may compare the header of each of the incoming packets to a digest in a primary array. To maintain the order of receipt of communications from the host device that identify the incoming packets, tag match logic circuitry on the network interface may walk the entries in the primary array from the oldest entry toward the newest entry each time that the tag match logic circuitry attempts to match an incoming packet with a digest in the primary array. In several embodiments, the tag match logic circuitry may walk the entries in the primary for more than one incoming packets concurrently. For instance, the entries in the primary array may include the oldest entry at the front of the primary array and array generation logic circuitry may add the newest entries to the back of the primary array. In several embodiments, the primary array comprises a list of entries. In further embodiments, the list may be a linked list to allow link management logic circuitry to remove entries that match incoming packets from the linked list.

The link management logic circuitry may remove an entry from the linked list without rebuilding the list in the primary array by changing the links between entries in the list. Such embodiments advantageously reduce the walk lengths for matching subsequent incoming packets without spending a sizeable number of cycles, or time period, to reconstruct the list in the primary array. Furthermore, embodiments that implement the entries in the primary array that include tags and digests, advantageously reduce the latency of a walk or progression through the list in the primary array. As the tag match logic circuitry advances through each entry in the primary array, the tag match logic circuitry can compare the header of an incoming packet with the digest in an entry to determine if the incoming packet does not match the full matching criteria in a corresponding full entry in the secondary array without reading the full matching criteria from the corresponding full entry in the secondary array. In other words, many full entries in the secondary array will not match the incoming packet and many embodiments reduce the latency of traversing the list by reducing the amount of time required to identify full entries in the secondary array that do not match the incoming packet.

FIG. 3 illustrates an embodiment of a communications flow 300 that may be representative of a series of communications that computing devices 102-1 and 102-5 exchange. In various embodiments, the communications that the computing devices 102-1 and 102-5 exchange according to the communications flow 300 may comprise transport-layer communications. In some embodiments, the computing devices 102-1 and 102-5 may exchange such transport-layer communications in support of application-layer communications between the computing devices 102-1 and 102-5. For example, the communications flow 300 may be representative of communications that computing devices 102-1 and 102-5 may exchange in various embodiments in conjunction with the transmission of the packets 232-1 to 232-N from the computing device 102-1 to the computing device 102-5 in operating environment 200 of FIG. 2. The packets 232-1 to 232-N may comprise the various segments of the message 107.

As shown in FIG. 3, the communications flow 300 may begin at 302, where the computing device 102-1 may transmit a send request to the computing device 102-5. In some embodiments, this send request may comprise a request on the part of a transport-layer entity at the computing device 102-1 to establish a transport-layer session with a transport-layer entity at the computing device 102-5 and to send one or more packets to the transport-layer entity at the computing device 102-5. At 304, the computing device 102-5 may send an acceptance to the computing device 102-1. This acceptance may constitute an indication on the part of the transport-layer entity at the computing device 102-5 that the transport-layer entity at the computing device 102-1 may send the one or more packets as requested. In some embodiments, the send request transmitted at 302 may comprise a request-to-send (RTS), and the acceptance sent at 304 may comprise a clear-to-send (CTS).

The exchange of the send request and the acceptance may constitute a handshake 301. In some embodiments, the handshake 301 may comprise a wire-level handshake between respective transport-layer entities at the computing devices 102-1 and 102-5. In various embodiments, the completion of the handshake 301 may establish a transport-layer session between the respective transport-layer entities at the computing devices 102-1 and 102-5. Further embodiments may include other types of commands such as a get command, put command, or an atomic command. For instance, with the get command, the computing device 102-5 may request that the computing device 102-1 send the message 107 in the form of one or more packets via a network.

In some embodiments, following receipt of the acceptance from computing device 102-5, computing device 102-1 may initiate a packet transfer process 305. According to the packet transfer process 305, the computing device 102-1 may send the packets 1, 2, 3, and 4 to the computing device 102-5 at 306, 308, 310, and 312, respectively. The respective payloads of packets 1, 2, 3, and 4 may each contain segments of an application-layer message such as the message 107 of FIG. 2. In the context of operating environment 200 of FIG. 2, the communications flow 300 may be representative of some embodiments in which N is equal to 4. In such embodiments, the computing device 102-1 partitions the message 107 into four data segments 230-1 to 230-4 and delivers these to the computing device 102-5 in the respective payloads 234-1 to 234-4 of the four packets 232-1 to 232-4. As reflected in FIG. 3, packets 1, 2, 3, and 4 may not necessarily arrive at the computing device 102-5 in the same order as the order in which the computing device 102-1 sends the packets 1, 2, 3, and 4. In the example depicted in FIG. 3, the packet 2 is the second packet sent by computing device 102-1 but the last packet received by the computing device 102-5.

According to the packet transfer process 305, at each of 314, 316, 318, and 320, the computing device 102-5 may send an acknowledgment to acknowledge receipt of a respective one of packets 1, 2, 3, and 4. In other words, the computing device 102-5 may send a first acknowledgment at 314 to acknowledge packet 1, a second acknowledgment at 316 to acknowledge packet 3, a third acknowledgment at 318 to acknowledge packet 4, and a fourth acknowledgment at 320 to acknowledge packet 2. Other embodiments may employ a different packet transfer process or protocol.

Figure 4:
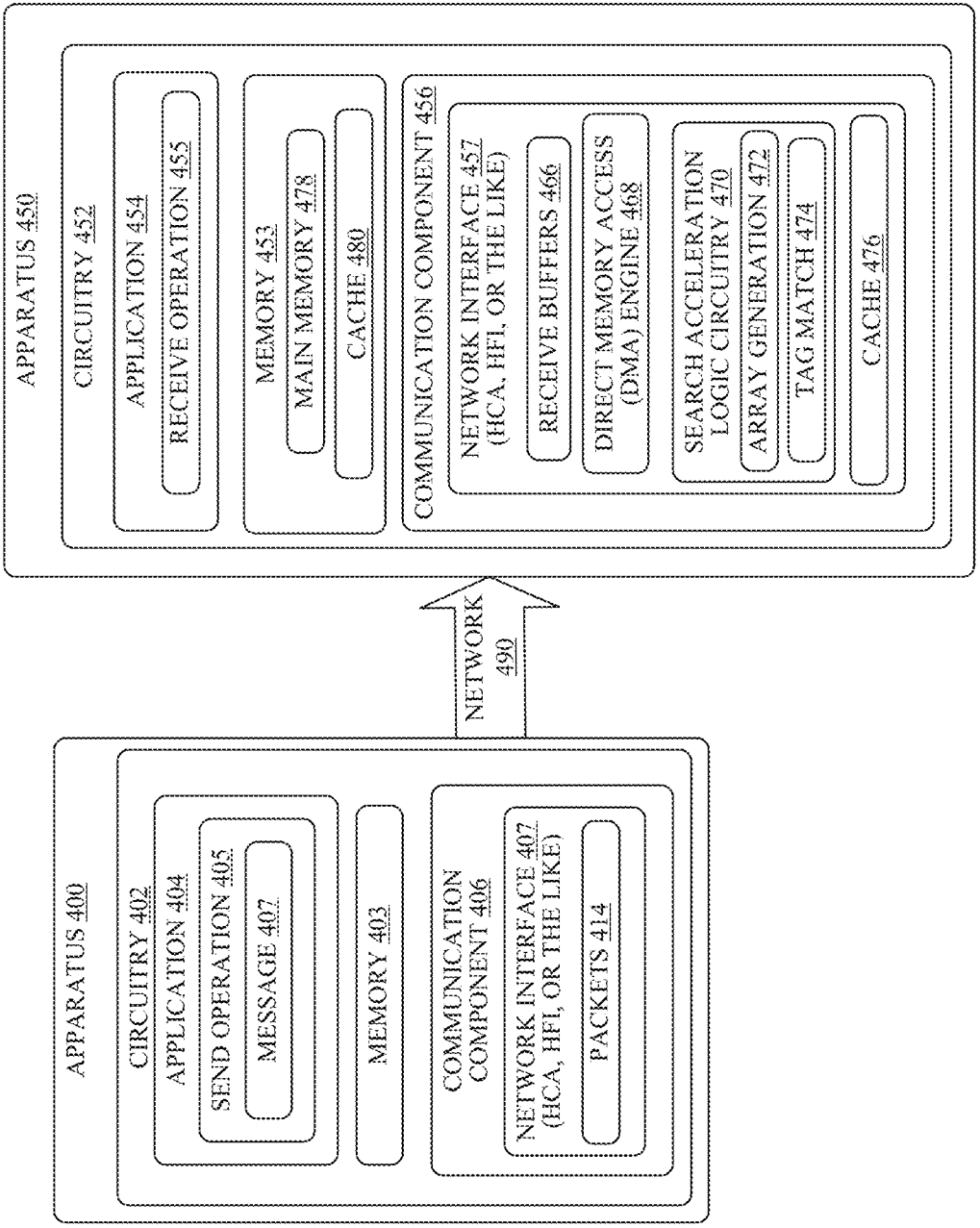
FIG. 4 depicts an embodiment of an initiator device and a target device for transmission of a message through a communication network, such as the communication network shown in FIG. 1.

FIG. 4 illustrates embodiments of apparatuses 400 and 450 such as the computing devices 102-1 and 102-5, respectively, of FIGS. 1-3. The apparatus 400 may be an initiator device that sends an application-layer message 407 and the apparatus 450 may be a target device that receives that application-layer message 407. As shown in FIG. 4, both apparatuses 400 and 450 comprise multiple elements, including respective circuitry 402 and 452, respective memories 403 and 453, and respective communications components 406 and 456. The embodiments, however, are not limited to the type, number, or arrangement of elements shown in this figure.

The circuitry 402 and the circuitry 452 may execute one or more software or firmware implemented modules or components, which may include respective applications 404 and 454 that implement a network programming interface such as Portals. In some embodiments, the circuitry 402 may execute the communication component 406 as a component of the application 404 to manage communications between apparatus 400 and one or more remote devices in accordance with the network programing interface. In various embodiments, the circuitry 452 may execute the communication component 456 as a component of the application 454 to manage communications between apparatus 450 and one or more remote devices. In some embodiments, communication components 406 and 456 may be operative to send and/or receive messages such as the message 407 via a communication network 490 like communication network 101 of FIG. 1. In various embodiments, communications components 406 and 456 may additionally comprise logic, circuitry, and/or instructions operative to perform various operations in support of such communications. Examples of such operations may include—without limitation—selection of transmission and/or reception parameters and/or timing, packet and/or protocol data unit (PDU) construction and/or deconstruction, encoding and/or decoding, error detection, and/or error correction.

In the present embodiment, the communication components 406 and 456 comprise network interfaces 407 and 457, respectively. The network interfaces 407 and 457 may be NICs such as a host channel adapter (HCA), a host fabric interface (HFI), or the like and the network 490 may comprise a switched fabric. In other embodiments, the network 490 may comprise a shared medium and the network interfaces may comprise a different type of NIC such as an Ethernet card. In some embodiments, the network interfaces 407 and 457 may include more than one type of NIC such as a NIC for switched fabric and a NIC for a shared medium, the network 490 may include more than one type of communications medium, and network interfaces 407 and 457 may coordinate communications over the multiple types of media of the network 490.

The communication component 406 may receive a message 407, such as the message 107 in FIGS. 1-2, from the application 404 and deconstruct the message 407 into one or more data payloads or data segments. The communication component 406 may provide the one or more data payloads to the network interface 407 for transmission. Thereafter, the network interface 407 may form or create the packets 414 with the data payloads and transmit the packets 414 to the apparatus 450 via the network 490. In other embodiments, the communication component 406 may aggregate more than one messages such as message 407 as a data payload for transmission via the network 490.

The network interface 457 of the apparatus 450 may receive the one or more incoming packets 414, each encompassing portions of the message 407 as data payloads. After physical layer and data link layer processing, the network interface 457 may store the incoming packets 414 in receive buffers 466. Considering that the receive buffers 466 may not receive the incoming packets 414 in a correct order for reconstruction of the message 407, the receive buffers 466 may store the incoming packets 414 while the network interface 457 reconstructs the message 407 in the memory 453.

As part of the receive operation 455 and prior to receipt of the incoming packets 414, the application 454 may communicate with the communication component 456 to identify the incoming message 407 from the apparatus 400 including one or more memory locations for storage of the message 407. The communication component 456, in accordance with a communication protocol common to both the communication component 406 and the communication component 456, may provide the network interface 457 with data, or full matching criteria, to identify each of the incoming packets 414 as well as a memory location at which to store the data payload of each of the incoming packets 414 to reconstruct the message 407 for the application 454. In some embodiments, the communication component 456 may also provide memory locations in which to store headers, or portions of headers, of one or more of the incoming packets 414.

In response to receipt of the full matching criteria and memory locations, the search acceleration logic circuitry 470 of the network interface 457 may receive, process, and arrange the full matching criteria and memory locations to prepare for receipt of the incoming packets 414. In some embodiments, the search acceleration logic circuitry 470 may comprise an application specific integrated circuit (ASIC) to implement functionality described herein. In other embodiments, the search acceleration logic circuitry 470 may comprise a general-purpose processor or a specific-purpose processor and code to execute on the processor to implement functionality described herein. In further embodiments, the search acceleration logic circuitry 470 may comprise any combination of an application specific integrated circuit, a general-purpose processor to execute code, a specific-purpose processor to execute code, and code to implement functionality described herein.

The search acceleration logic circuitry 470 may comprise an array generation logic circuitry 472 and a tag match logic circuitry 474. The array generation logic circuitry 472 may generate a primary array and a secondary array in the cache 476 based on receipt of the full matching criteria and the memory locations for storing data payloads of the incoming packets 414. The array generation logic circuitry 472 may generate the primary array as a list of entries and each entry may include a tag and a digest. In some embodiments, each entry may also include a link to a subsequent entry in the list to form a linked list data structure in a set associative cache. The tag may associate the entry in the primary array with a corresponding full entry in the secondary array.

The digest may comprise selected portions of the full matching criteria (or data) to identify one of the incoming packets 414, combined portions of the full matching criteria, a hash of at least a portion of the full matching criteria, an encoding of the full matching criteria, randomly-selected portions of the full matching criteria, a summary of bits of the full matching criteria, or a combination thereof. In some embodiments, the array generation logic circuitry 472 may generate the digest by the same process for every incoming packet 414. In other embodiments, the array generation logic circuitry 472 may generate the digest differently depending upon information included in the full matching criteria. And, in some embodiments, the array generation logic circuitry 472 may look-up a process or function in a table or list of more than one processes, to generate a digest based on content of the full matching criteria. In further embodiments the array generation logic circuitry 472 may receive an indication of a process or receive the process to generate a digest from the communication component 456.

The array generation logic circuitry 472 may generate the secondary array as a list of full entries and each full entry may include full matching criteria, or data, and a memory location. The array generation logic circuitry 472 may store the secondary array in the cache 472, in a backing store, or in a combination of both. In some embodiments, the backing store may reside the memory 453 of the host device of the apparatus 450 such as in a main memory 478 for the application processor(s) of the apparatus 450 or a cache 480 for the application processor(s) of the apparatus 450.

After generation of the primary and secondary arrays, the tag match logic circuitry 474 may match the incoming packets 414 with corresponding memory locations stored in the secondary array and instruct the direct memory access (DMA) engine 468 to store at least the data payloads of the incoming packets 414 in the memory 453 at the memory locations stored in the secondary array. Note also that, in some embodiments, the tag match logic circuitry 474 perform the matching function for more than one of the incoming packets 414 concurrently.

More specifically, the tag match logic circuitry 474 may couple with the receive buffers 466 to compare a first incoming packet 414 to a first digest in a first entry of a primary array to determine whether the first incoming packet matches the first digest. If the first incoming packet matches the first digest, the tag match logic circuitry 474 may retrieve a first full entry from the secondary array via the first tag and compare the first full entry, or the full matching criteria of the first full entry, with the first incoming packet 414. If the first full entry matches the first incoming packet 414, the tag match logic circuitry 474 may store at least a portion of the first incoming packet 414 (such as the data payload) at a first memory location of the first full entry in the secondary array.

On the other hand, in the absence of a match between the first incoming packet 414 and the first digest or between the first incoming packet 414 and the first full entry, the tag match logic circuitry 474 may compare the first incoming packet 414 to subsequent entries in the primary array to identify a full entry in the secondary array that matches the first incoming packet 414. In other words, the tag match logic circuitry 474 may traverse the primary array one entry at a time from the first entry (or head entry) in the primary array to an entry in the primary array that includes a digest that matches the header of the first incoming packet 414. If the digest matches, there is a possibility that the first incoming packet 414 will match the full matching criteria in the corresponding full entry in the secondary array so embodiments may read the full matching criteria from the secondary array to determine if the first incoming packet 414 does match that full entry. On the other hand, if the digest does not match the header of the first incoming packet 414, the first incoming packet 414 will not match the corresponding full matching criteria so such embodiments advantageously avoid the additional latency involved with reading the full matching criteria corresponding to a digest that does not match the incoming packet 414.

If the first incoming packet 414 does not match the first digest in the first entry of the primary array, the tag match logic circuitry 474 progresses to the second entry in the primary array and compares the digest in the second entry of the primary array against the first incoming packet 414. If the digest in the second entry matches, the tag match logic circuitry 474 may compare the first incoming packet 414 to the corresponding full entry in the secondary array. Otherwise, the tag match logic circuitry 474 may compare the first incoming packet 414 to the third entry in the primary array.

Once the tag match logic circuitry 474 finds a match of a full entry and the incoming packet 414, the search acceleration logic circuitry 470 may store the incoming packet or a portion thereof in the memory 453 and remove the matching entry in the primary array and in the secondary array. For example, if the matching entry in the primary array is the second entry and the entries form a linked list, the search acceleration logic circuitry 470 may change the link in the first entry of the primary array to identify the third entry of the primary array. As a result, when the tag match logic circuitry 474 compares a second incoming packet 414 to a second entry in the primary array, the second entry is the entry that was previously the third entry in the primary array, advantageously reducing the latency for traversing the primary array for subsequent incoming packets 414.

After the tag logic circuitry 474 matches all the incoming packets 414 to memory locations and the DMA engine 468 stores each portion of the incoming packets 414 in the corresponding memory locations, the tag logic circuitry 474 reconstructs the message 407 via the DMA engine 468 for use by the application 454.

In various embodiments, either or both of circuitry 402 and circuitry 452 may comprise circuitry of a processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). In some embodiments, either or both of circuitry 402 and circuitry 452 may comprise circuitry of a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In various embodiments, either or both of circuitry 402 and circuitry 452 may be implemented using any of various commercially available processors, including— without limitation—AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. The embodiments are not limited in this context.

In various embodiments, apparatuses 400 and 450 may comprise or communicatively couple with respective memories 403 and 453. Either or both of memories 403 and 453 may comprise any machine-readable or computer-readable media capable of storing data, including both volatile and non-volatile memory. For example, either or both of memories 403 and 453 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion of or the entire memories 403 and 453 may reside on the same respective integrated circuits as circuitry 402 and circuitry 452, or alternatively some portion of or the entire memories 403 and 453 may reside on integrated circuits or other media, for example hard disk drives, that are external to the respective integrated circuits of circuitry 402 and circuitry 452. Although memories 403 and 453 are comprised within respective apparatuses 400 and 450 in FIG. 4, memories 403 and 453 may be external to respective apparatuses 400 and 450 in some embodiments.

Figure 5:
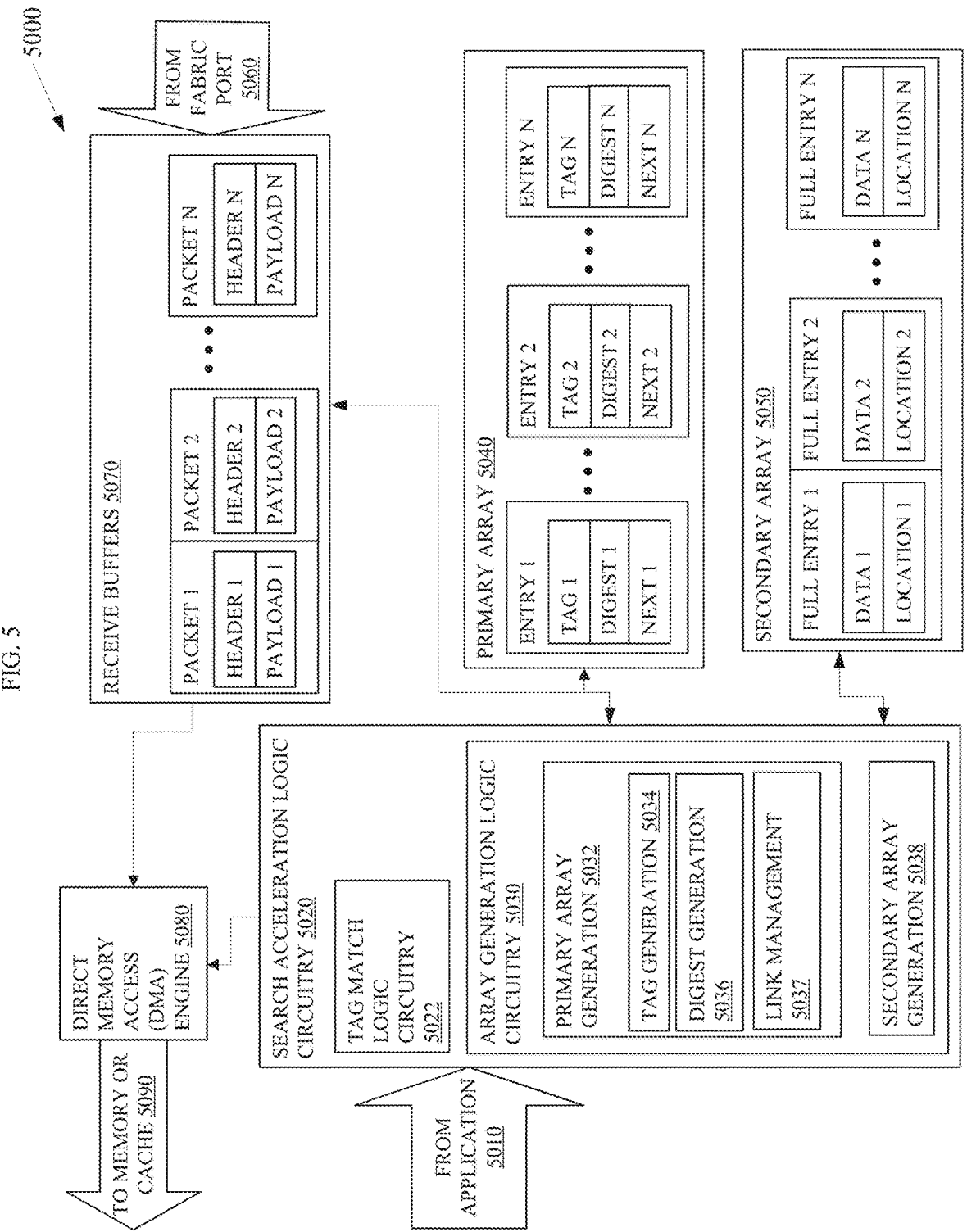
FIG. 5 depicts an embodiment of an end-point protocol at a transport layer to provide an incoming packet that includes a message or a portion of the message to a host device, such a computing device illustrated in FIG. 1.

FIG. 5 illustrates an embodiment of an end-point protocol 5000 at a transport layer to provide an incoming packet that includes a message or a portion of the message to a host device, such a computing device illustrated in FIG. 1 and the apparatus 450 in FIG. 4. These embodiments may store an entry comprising a tag, a next pointer, and a digest in a primary array 5040, also referred to as a tag array. For example, the tag may be four bytes, the next pointer may be two bytes, and the digest may be two bytes, for a total entry size of approximately 8 bytes. This is within the size in which it would be acceptable to implement a 4-8 way set associative tag which is accessible in approximately 3 cycles. In such embodiments, the full 64-byte entry may require seven cycles to access.

In the present embodiment, the search acceleration logic circuitry 5020 may embody the end-point protocol 5000. The search acceleration logic circuitry 5020 may generate the primary array 5040 and the secondary array 5050 based on input from an application 5010 that describes incoming packets such as packet 1 through packet N in the receive buffers 5070. The incoming packets may arrive via a fabric port 5060 such as a host fabric interface (HFI) or a host channel adapter (HCA). In other embodiments, the port may comprise a port for a different type of network such as an Ethernet port or a wireless communications port.

The search acceleration logic circuitry 5020 may couple with the receive buffers 5070 to access the incoming packets and compare the headers of the incoming packets with digests in the primary array 5040 and data in the full entries 5050 to match the incoming packets with memory locations (location 1 through location N) in the full entries (entry 1 through N) of the second array 5050. Once matched, the DMA engine 5080 may store the data payloads such as payloads 1 through N in the memory or cache 5090 of a host device.

The search acceleration logic circuitry 5020 may comprise array generation logic circuitry 5030 to generate arrays such as the primary array 5040 and the secondary array 5050 in a local cache and/or memory and/or a cache or memory in the host device such as the computing device 102-5 in FIGS. 1-2 and the apparatus 450 in FIG. 4. The array generation logic circuitry 5030 comprises primary array generation logic circuitry 5032 and secondary array generation logic circuitry 5038.

The secondary array generation logic circuitry 5038 may store the full matching criteria for each packet and the memory location for each packet in a series or list of full entries such as full entry 1 through full entry N. For instance, the full entry 1 may comprise the full matching criteria, data 1, for the memory location, location 1, indicating that the location 1 is the memory location to store a data payload of the incoming packet that has a header that matches data 1.

The primary array generation logic circuitry 5032 may generate an entry in the primary array for each incoming packet by adding each new entry at the end of a linked list. The primary array generation logic circuitry 5032 may comprise a tag generation logic circuitry 5034 to generate a tag for each entry. A tag may identify a memory location of a full entry in the second array 5050 to relate a digest in the entry in the primary array 5040 with full matching criteria in a full entry of the secondary array 5050. For example, the entry 1 may include a tag 1, a digest 1, and a link to a subsequent entry in the primary array 5040 such as the entry 2. The tag 1 may identify the location of the full entry 1 in the secondary array 5050 to indicate that the full matching criteria in data 1 of the full entry 1 corresponds to the digest 1 in the entry 1 of the primary array 5040. The tag may be an address, an identifier, or the like, or a combination thereof, that can associate an entry in the primary array 5040 with a full entry in the secondary array 5050.

The digest generation logic circuitry 5036 may generate a digest (digest 1 through digest N) for each entry (entry 1 through entry N) in the primary array 5040. The digest may be a subset of the full matching criteria, a combination of portions of the full matching criteria, random bits from the full matching criteria, selected bits from the full matching criteria, or the like, or a combination thereof. In some embodiments, the digest generation logic circuitry 5036 may generate a digest by combining one or more subsets (or portions) of the bits of the full matching criteria with, e.g., a logical XOR function or another logical function.

Some embodiments base the generation of the digests on rules associated with the network programming interface such as a Portals 4.02 programming interface. In Portals, for example, the header of a packet may include a source process identifier (PID), a source node identifier (NID), and a set of match bits. There are two sets of bit patterns: a set of ignore bits (or mask bits) and the set of must match bits (or match bits). The mask bits facilitate the use of wildcards and other flexibilities in relation to the matching entries. Thus, embodiments may generate a digest by a process that takes into consideration the mask and match bits for the packet header.

In accordance with the rules associated with the Portals programming interface, a matching function, such as the tag match logic circuitry 5022 may use the PID, the NID, and the match bits and mask bits to match incoming packet headers (header 1 through header N) with full matching criteria (data 1 through data N) in the secondary array 5050. In several embodiments, the sets of match and mask bits may comprise 64 bits. Using a logical XOR function, a matching function may XOR the PID, NID, and match and mask bits together with the corresponding bits in the header of the incoming packet to determine if the full matching criteria matches the incoming packet header. If the full matching criteria matches the incoming packet header, the result of the XOR operation will be all zero bits. Otherwise, the result of the XOR operation will not be all zero bits.

In several embodiments, in addition to matching a pre-posted list entry, the tag match logic circuitry 5022 may apply a permissions check to an incoming message. The tag match logic circuitry 5022 may apply the permissions check after identifying the correct buffer. The permissions check may have two components: the target of the message allows the initiator to access the buffer and allows the specified operation type. Each list entry and match list entry may specify which types of operations that are allowable, e.g., a put and/or get, as well as a user ID that can identify which initiators have authorization to access the buffer.

Furthermore, the tag match logic circuitry 5022 may verify that the incoming message, or at least a portion thereof, fits in the buffer at the memory location indicated by a matching full entry in the secondary array 5050. In some embodiments, the tag match logic circuitry 5022 may include preferences or settings, such as a preference or setting to truncate an incoming message that does not fit in a matching buffer or a preference or setting to not truncate an incoming message that does not fit in a matching buffer. In such embodiments, the tag match logic circuitry 5022 may compare the incoming message or the portion of the incoming message that is designated for storage at the memory location with a size of the buffer at the memory location. If the preference or setting to truncate is set to truncate, then the tag match logic circuitry 5022 may truncate the incoming message, or a portion thereof that is designated for storage in the buffer so the incoming message, or portion thereof, fits in the buffer. On the other hand, if the preference or setting to truncate is set to not truncate and the incoming message, or portion thereof, does not fit in the buffer, the tag match logic circuitry 5022 may determine that the current full entry in the secondary array 5050 does not match and may determine if the incoming message matches the digest in the next entry in the primary array 5040.

The digest generation logic circuitry 5036 may account for the use of mask and match bits. For instance, in some embodiments, the digest generation logic circuitry 5036 may generate the digest by XORing a specific number of bits of the header to reduce the bits in the header to a specific number of bits such as 4 bits. The digest generation logic circuitry 5036 may also select 6 bits of the mask bits and 6 bits of the match bits to include in the digest. As a result, the digest is 16 bits or 2 bytes in size. Note that in other embodiments, the matching function may be different and may have different criteria.

The link management logic circuitry 5036 may add new entries to the primary array and new full entries to the secondary array as well as remove entries from the primary array that the tag match logic circuitry 5022 matches with one of the incoming packets. For example, more than one process may transmit incoming packets that the receive buffers 5070 maintain or buffer. Thus, when the array generation logic circuitry 5030 generates additional entries for the primary array 5040, the link management logic circuitry 5037 may track the last entry in the primary array and adjust the link at the last entry to indicate the new entry.

In many embodiments, the link management logic circuitry 5037 may also remove entries from the primary array 5040 by modifying the link (next 1 through next N) in the primary array 5040 that identifies the next entry in the primary array 5040. Furthermore, the link management logic circuitry 5037 may track and overwrite entries in the secondary array after the search acceleration logic circuitry 5020 matches such entries with the current incoming packet and writes the payload data of the incoming packet to the memory or cache 5090.

The tag match logic circuitry 5022 may match headers (header 1 through header N) of incoming packets with digests (digest 1 through N) in the primary array 5040, starting with the first entry (entry 1) in the primary array 5040 and traversing the primary array 5040 one entry at a time until the tag match logic circuitry 5022 determines that the digest of an entry matches the incoming packet. For instance, the tag match logic circuitry 5022 may invoke the same process implemented to create the digest in the process of computing a match between the incoming packet and the digest. The tag match logic circuitry 5022 may apply the mask bits to the header. If the digest generation logic circuitry 5036 combines multiple bits together with a logical function such as XOR, the tag match logic circuitry 5022 may implement the same process or instruct the digest generation logic circuitry 5036 to perform the same process on the header of the incoming packet. Thereafter, the tag match logic circuitry 5022 may perform a logical function such as XOR to combine the masked and processed header with the digest to determine if the digest matches the incoming packet.

If the digest does not match the incoming packet, the tag match logic circuitry 5022 may advance to the next entry in the primary array 5040 to determine if the digest in the next entry matches the incoming packet. If the tag match logic circuitry 5022 determines that the digest in the entry in the primary array 5040 matches the incoming packet then the tag match logic circuitry 5022 may retrieve the full matching criteria corresponding to that entry and determine if the full matching criteria matches the incoming packet. If the digest does match, the tag match logic circuitry 5022 may instruct the DMA engine to store the payload of the incoming packet in the memory or cache 5090 at the location associated with the full matching criteria. Furthermore, the tag match logic circuitry 5022 may advance to the next packet in the receive buffers 5070. Otherwise, the tag match logic circuitry 5022 may advance to the next entry in the primary array 5040 and so on until the tag match logic circuitry 5022 finds a match.

In some embodiments, if the tag match logic circuitry 5022 does not find a match in the primary array, the full matching criteria may reside in a backing store. In such embodiments, the tag match logic circuitry 5022 may retrieve the full matching criteria from the backing store.

Figure 6A:
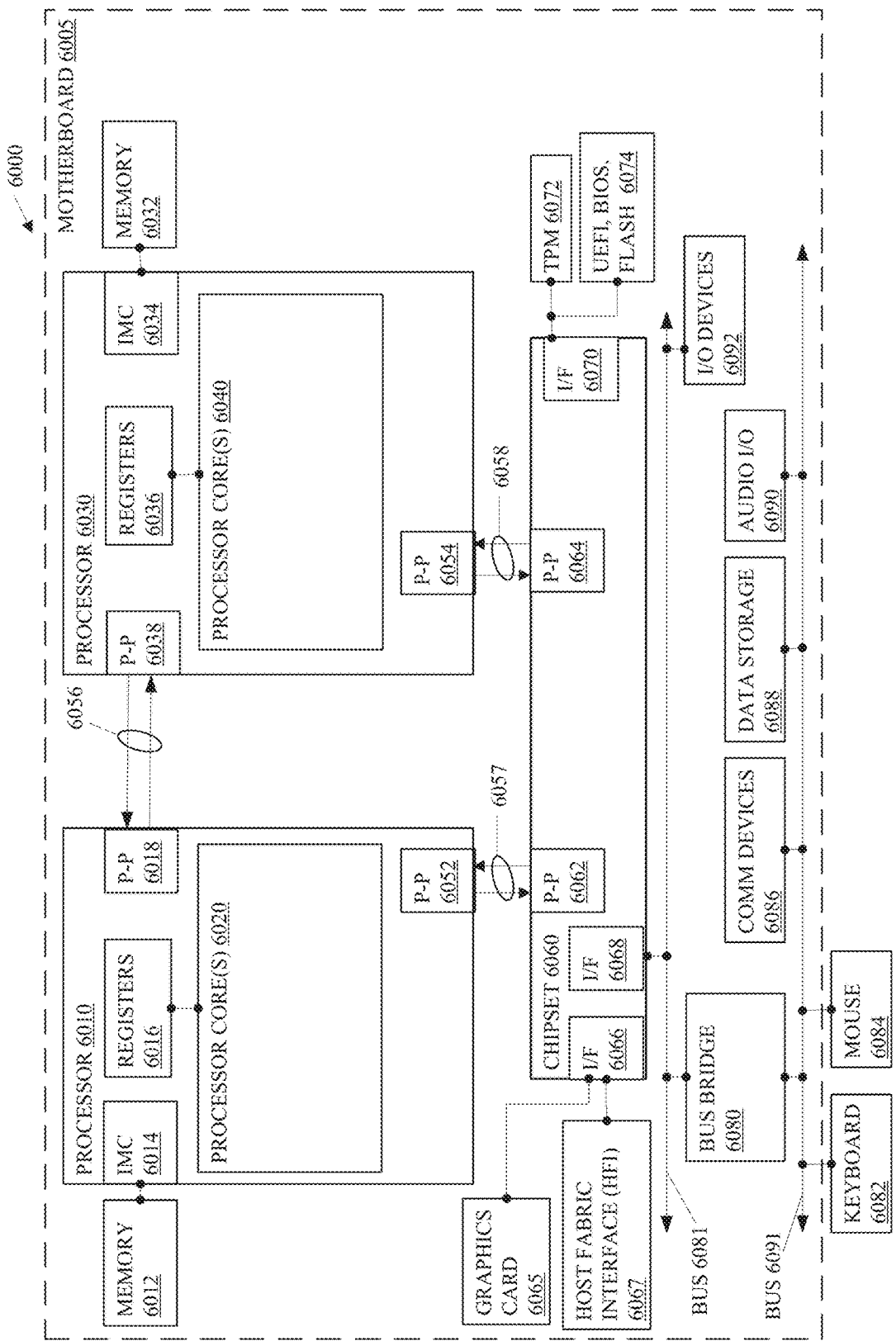
FIGS. 6A-B depict flowcharts of embodiments of a host device and a network interface that is a host fabric interface (HFI) card such as the computing devices illustrated in FIGS. 1-2.

FIG. 6A illustrates an embodiment of a system 6000 such as the computing devices 102-1 through 102-5 in FIGS. 1-2 and the apparatuses 400 and 450 in FIG. 4. The system 6000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 6000 may have a single processor with one core or more than one processor. Note that the term "processor" refers to a processor with a single core or a processor package with multiple processor cores.

As shown in FIG. 6A, system 6000 comprises a motherboard 6005 for mounting platform components. The motherboard 6005 is a point-to-point interconnect platform that includes a first processor 6010 and a second processor 6030 coupled via a point-to-point interconnect 6056 such as an Ultra Path Interconnect (UPI). In other embodiments, the system 6000 may be of another bus architecture, such as a multi-drop bus. Furthermore, each of processors 6010 and 6030 may be processor packages with multiple processor cores including processor core(s) 6020 and 6040, respectively. While the system 6000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 6010 and the chipset 6060. Some platforms may include additional components and some platforms may only include sockets to mount the processors and/or the chip set.

The first processor 6010 includes an integrated memory controller (IMC) 6014 and point-to-point (P-P) interfaces 6018 and 6052. Similarly, the second processor 6030 includes an IMC 6034 and P-P interfaces 6038 and 6054. The IMC's 6014 and 6034 couple the processors 6010 and 6030, respectively, to respective memories, a memory 6012 and a memory 6032. The memories 6012 and 6032 may be portions of the main memory (e.g., a dynamic random-access memory (DRAM)) for the platform (such as the main memory 478 in FIG. 4) such as double data rate type 3 (DDR3) or type 4 (DDR4) synchronous DRAM (SDRAM). In the present embodiment, the memories 6012 and 6032 locally attach to the respective processors 6010 and 6030. In other embodiments, the main memory may couple with the processors via a bus and shared memory hub.

The processors 6010 and 6030 comprise caches coupled with each of the processor core(s) 6020 and 6040, respectively. The first processor 6010 couples to a chipset 6060 via P-P interconnects 6052 and 6062 and the second processor 6030 couples to a chipset 6060 via P-P interconnects 6054 and 6064. Direct Media Interfaces (DMIs) 6057 and 6058 may couple the P-P interconnects 6052 and 6062 and the P-P interconnects 6054 and 6064, respectively. The DMI may be a high-speed interconnect that facilitates, e.g., eight Giga Transfers per second (GT/s) such as DMI 3.0. In other embodiments, the processors 6010 and 6030 may interconnect via a bus.

The chipset 6060 may comprise a controller hub such as a platform controller hub (PCH). The chipset 6060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 6060 may comprise more than one controller hub such as a chipset with a memory controller hub, a graphics controller hub, and an input/output (I/O) controller hub.

In the present embodiment, the chipset 6060 couples with a trusted platform module (TPM) 6072 and the UEFI, BIOS, Flash component 6074 via an interface (I/F) 6070. The TPM 6072 is a dedicated microcontroller designed to secure hardware by integrating cryptographic keys into devices. The UEFI, BIOS, Flash component 6074 may provide pre-boot code.

Furthermore, chipset 6060 includes an I/F 6066 to couple chipset 6060 with a high-performance graphics engine, graphics card 6065 and a host fabric interface (HFI) 6067. The I/F 6066 may be, for example, a Peripheral Component Interconnect-enhanced (PCI-e). The HFI 6067 may include a network interface to couple the system 6000 with a connectivity fabric such as the connectivity fabric 103 in FIG. 1. The HFI 6067 may be a network interface card (NIC) coupled with the system 6000 or may comprise a portion of an integrated circuit of the chipset 6060 or of a processor such as the processor 6010 and/or the processor 6030. The HFI 6067 may interface the system 6000 with other systems or storage devices such as the computing devices 102-1 through 102-5 illustrated in FIG. 1 via a connectivity fabric such as Fibre Channel or the like.

Figure 6B:
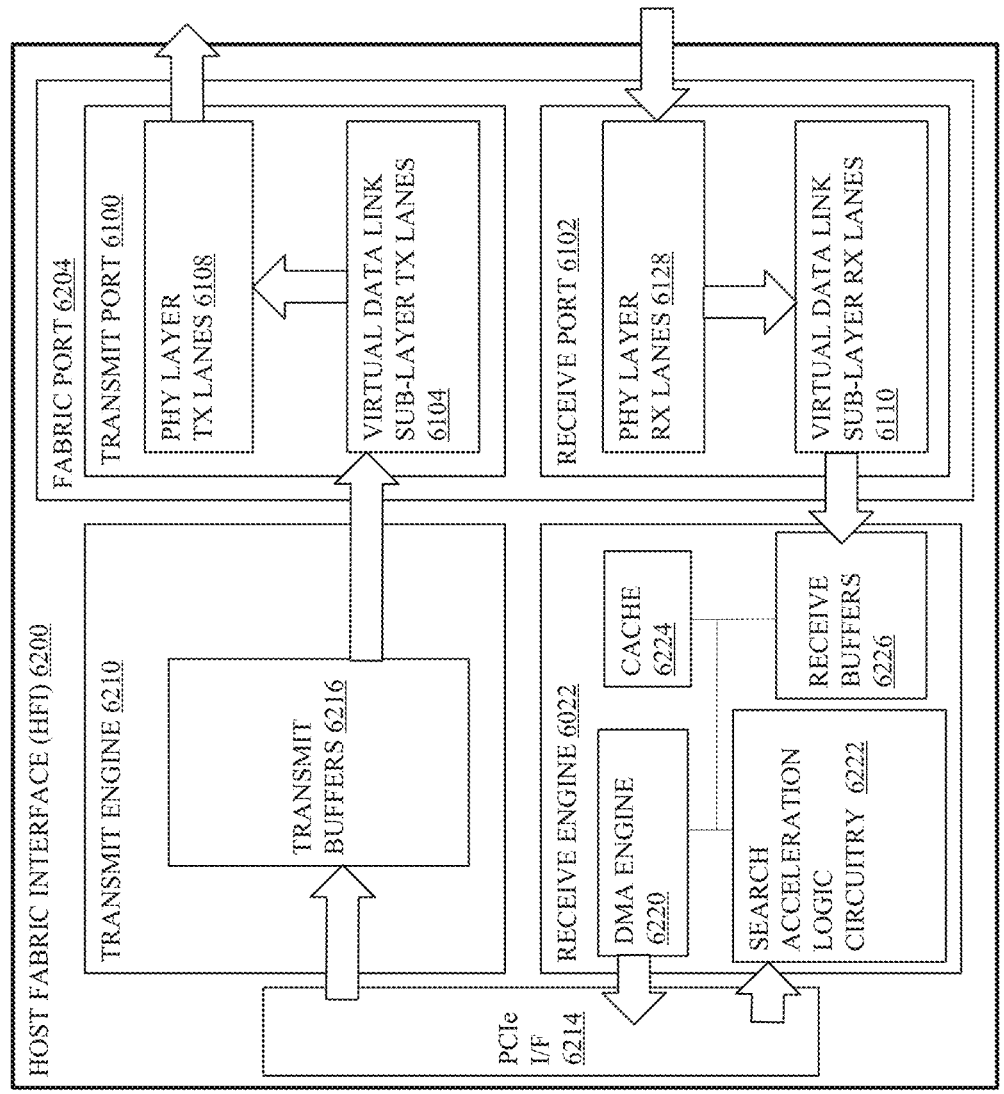

FIG. 6B illustrates an embodiment of a host fabric interface (HFI) 6200 such as the HFI 6067, of a node or computing device such as the computing devices 102-1 through 102-N in FIG. 1, the apparatuses 400 and 450 in FIG. 4, and the system 6000 in FIG. 6A. The host fabric interface (HFI) 6200 may comprise a fabric port 6204 coupled to a PCIe interface 6214, which couples to a processor and/or memory in a host device such as the processor 6010 and the memory 6012 in the system 6000 in FIG. 6A.

The fabric port 6204 includes a transmit port 6100 and a receive port 6102. Transmit port 6100 includes transmission (Tx) link fabric sub-layer circuitry including a transmit buffer partitioned into a plurality of transmit virtual lane (VL) buffers 6104 and Tx physical layer (PHY) circuitry 6108 including transmitters. The receive port 6102 may include receive (Rx) link fabric sub-layer circuitry including a receive buffer partitioned into plurality of receive VL buffers 6110 and Rx PHY circuitry 6128 including receivers.

HFI 6202 further includes a transmit engine 6210 and a receive engine 6022 coupled to a PCIe (Peripheral Component Interconnect Express) interface (I/F) 6214. The transmit engine 6210 may include transmit buffers 6216 to buffer or store fabric packets. In one embodiment, all, or a portion of the memory for transmit buffers 6216 comprise memory mapped input/output (MMIO) address space, also referred to a programmed IO (PIO) space. MMIO enables a processor of a host device to perform direct writes to the transmit buffers 6216, e.g., via direct memory access (DMA writes).

The receive engine 6022 may include receive buffers 6226, a DMA engine 6220, a search acceleration logic circuitry 6222, and a cache 6224. The receive buffers 6226 may buffer the output of the receive port 6102, which may include fabric packets. The DMA engine 6220 may perform DMA writes to copy the incoming packet payload data from the receive buffers 6226 to memory and/or one of the memory cache levels for a processor of the host device. For example, in some embodiments, a DMA engine stores packet header data in cache and stores a packet payload data in memory.

The search acceleration logic circuitry 6222 may generate a primary array and a secondary array in the cache 6224 and/or in memory of a host device and/or in cache of the host device. The primary array may comprise a list of entries that each include at least a tag to associate the entry with a corresponding full entry in the secondary array and a digest that provides a summary of the full matching criteria in the corresponding full entry of the secondary array. The secondary array may comprise the full matching criteria and a memory location at which to store at least a portion of a matching incoming packet.

The search acceleration logic circuitry 6222 may also match headers of the incoming packets in the receive buffers 6226 with the full matching criteria by traversing the primary array to locate a matching digest and then comparing the incoming packet to the full matching criteria in the corresponding entry of the secondary array. If the incoming packet matches the full matching criteria, the DMA engine 6220 may store the payload data of the incoming packet in memory or cache of the host device. Otherwise, the search acceleration logic circuitry 6222 may traverse the list in the primary array to the next entry that comprises a matching digest. This process may repeat until the search logic circuitry 6222 locates a digest that matches the incoming packet and corresponding full matching criteria that matches the incoming packet.

In further embodiments, a System on a Chip (SoC) integrates a processor and one or more HFIs 6200.

Referring again to FIG. 6A, various I/O devices 6092 couple to the bus 6081, along with a bus bridge 6080 which couples the bus 6081 to a second bus 6091 and an I/F 6068 that connects the bus 6081 with the chipset 6060. In one embodiment, the second bus 6091 may be a low pin count (LPC) bus. Various devices may couple to the second bus 6091 including, for example, a keyboard 6082, a mouse 6084, communication devices 6086 and a data storage unit 6088 that may store code such as the compiler 6096. Furthermore, an audio I/O 6090 may couple to second bus 6091. Many of the I/O devices 6092, communication devices 6086, and the data storage unit 6088 may reside on the motherboard 6005 while the keyboard 6082 and the mouse 6084 may be add-on peripherals. In other embodiments, some or all the I/O devices 6092, communication devices 6086, and the data storage unit 6088 are add-on peripherals and do not reside on the motherboard 6005.

Figure 7A:
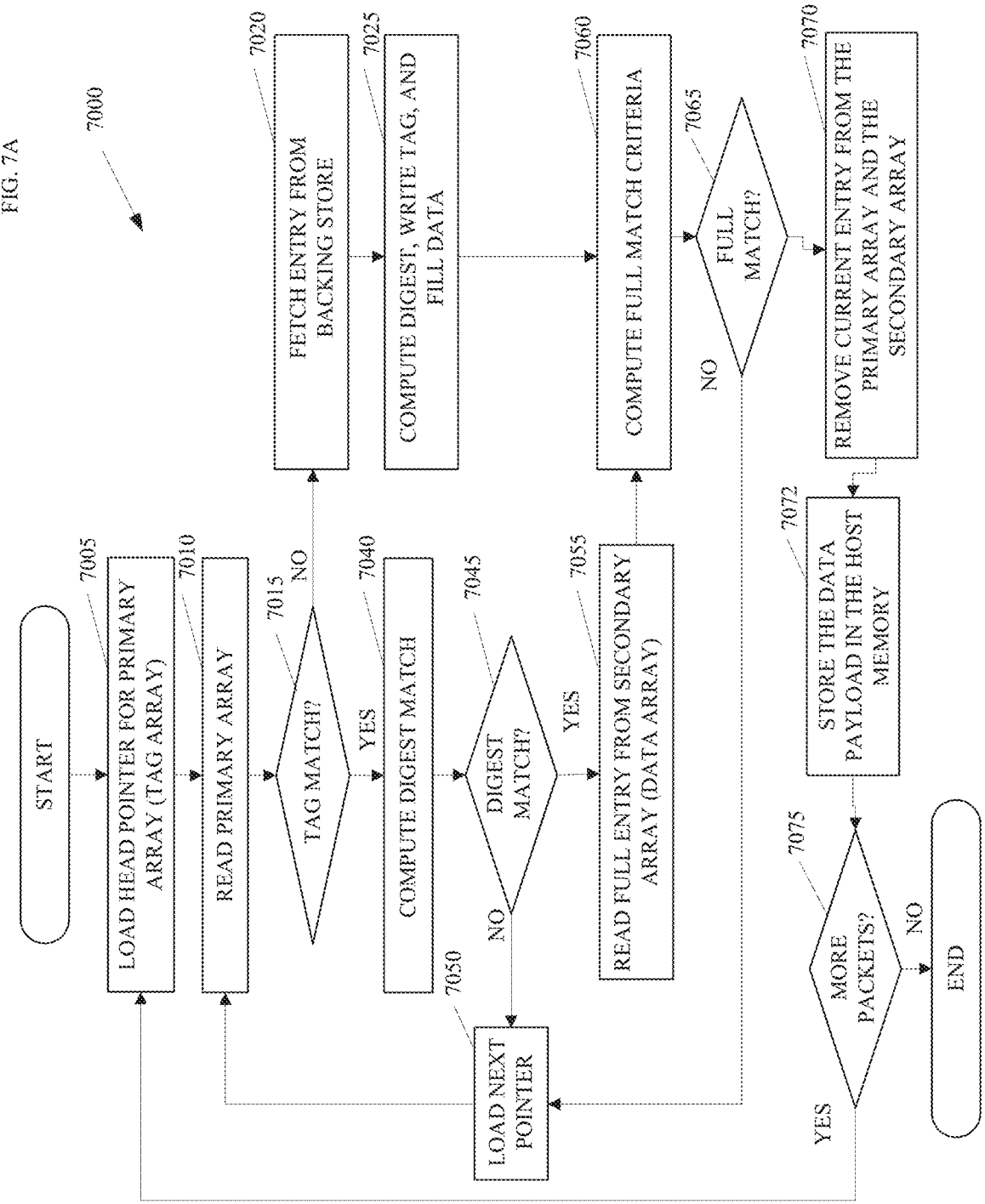
FIGS. 7A-B depict flowcharts of embodiments to establish and implement the end-point protocol to match incoming packets received at a transport layer interface of a network interface such as the network interface illustrated in FIGS. 2 and 3 and the HFI card illustrated in FIGS. 6A and 6B.
Figure 7B:
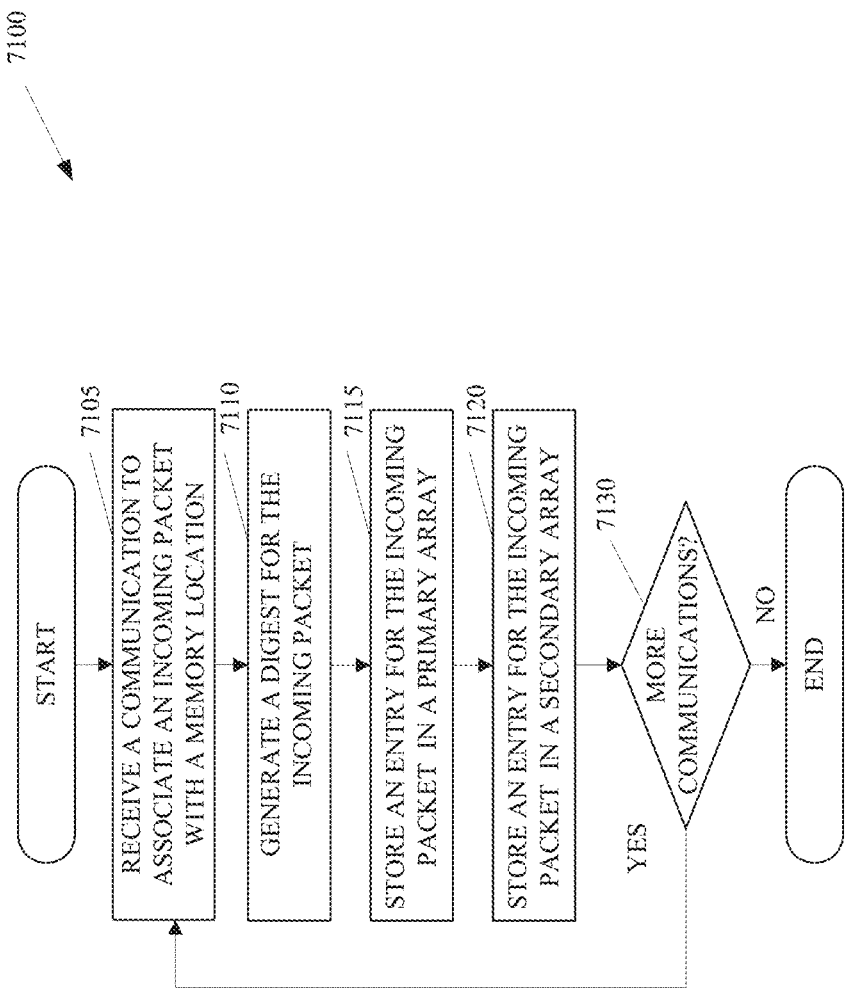

FIGS. 7A-B depict flowcharts of embodiments to establish and implement the end-point protocol to match incoming packets received at a transport layer interface of a network interface such as the network interface illustrated in FIGS. 2 and 3 and the HFI card illustrated in FIGS. 6A and 6B. FIG. 7A illustrates an embodiment of a flowchart 7000 to match incoming packets received at a transport layer interface of a network interface. Note that while the flowchart 7000 illustrates one instance of a matching function to match an incoming packet with a digest and full matching criteria, tag match logic circuitry, in some embodiments, can perform the matching function of the flowchart 7000 for multiple incoming packets in parallel or concurrently and removal of an entry from the primary array can advantageously reduce the walk length for matching another incoming packet in a concurrent process.

At the beginning of a linked list walk of a primary array, or traversal of the linked list, the tag match circuitry may determine the pointer for the first entry in the primary array (element 7005) and read the first entry in the primary array to load the head tag along with its digest (element 7010). If there is not an entry available at the pointer, i.e., if the pointer points to the end of the primary array or there are no entries in the primary array, the tag match logic circuitry may fetch an entry, or read an entry, from a backing store (element 7020). The backing store may be a higher latency store for retrieval of entries. In other words, if there is a cache miss in the primary array for a tag that matches the current incoming packet, the tag match logic circuitry may retrieve full entries stored in a backing store such as memory in a host device.

In some embodiments, the tag match logic circuitry may compute a digest based on the full entry retrieved from the backing store, write a tag and the digest into the primary array, and fill the data, or full matching criteria and memory location, in the secondary array (element 7025). Thereafter, the tag match logic circuitry may compute full match criteria (element 7060) to determine if the full matching criteria retrieved from the backing store matches the header of the current incoming packet. If the full matching criteria matches the incoming packet (element 7065), the link management logic circuitry may remove the current entry from the primary array and the secondary array (element 7070), a DMA engine may store the data payload of the current incoming packet in memory of the host device (element 7072), and the tag match logic circuitry may determine if there are more incoming packets to match (element 7075). Otherwise, the tag match logic circuitry may load the next pointer in the primary array (element 7050), read the entry at the pointer from the primary array (element 7010), and determine if there is an entry at the current pointer, a tag match (element 7015).

If there is a tag match (element 7015), the tag match logic circuitry may compute a digest match (element 7040). In some embodiments, the tag match logic circuitry may compute the digest match by applying a mask, if applicable, to the header of the incoming packet, applying the digest generation process to the header of the incoming packet, and comparing the bits of the masked and processed header by, e.g., performing a logical operation such as an XOR operation or function. If the result of the logical operation indicates that the masked and processed header fails to match the digest, then the digest does not match (element 7045) and the tag match logic circuitry may load the next pointer for the primary array (element 7050), read the entry at the pointer from the primary array (element 7010), and determine if there is an entry at the pointer, a tag match (element 7015).

If the computation indicates that the digest matches the header of the incoming packet (element 7045), the corresponding full entry in the secondary array may include full matching criteria that matches the header of the incoming packet. As a result, the tag match logic circuitry may incur an additional, e.g., seven cycles of latency to fetch the full entry from the secondary array (element 7055) to perform a full match calculation.

After reading the full entry that corresponds to the digest via the tag (element 7055), the tag match logic circuitry may determine if the full matching criteria corresponding to the digest in the current entry of the primary array matches the header of the current incoming packet. If the full matching criteria matches (element 7065), the link management logic circuitry may remove the current entry from the primary array and the secondary array (element 7070), the tag match logic circuitry may store the data payload of the current incoming packet in memory of the host device at the memory location associated with the full entry in the secondary array (element 7072), and the tag match logic circuitry may determine if there are more incoming packets to match (element 7075). If there are no incoming packets in the receive buffers (element 7075) the process may end until more packets arrive. Otherwise, the tag match logic circuitry may load the head pointer for the primary array (element 7005) to start the walk through the primary array from the first entry in the primary array for the next incoming packet in the receive buffers.

FIG. 7B illustrates an embodiment of a flowchart 7100 to generate a primary array and a secondary array based on communications received from a software application executing on a host device. The flowchart 7100 begins with receiving a communication from a software application executing on the host device that associates an incoming packet with a memory location (element 7105). In some embodiments, the communication may also associate the incoming packet with full matching criteria as well as mask bits and matching bits.

An array generation logic circuitry, such as the array generation logic circuitry illustrated in FIGS. 4, 5, and 6B, may generate a digest for the incoming packet (element 7110). The array generation logic may store the digest with a tag in an entry at the end of the primary array (element 7115) and store the full matching criteria with the memory location in a full entry in the secondary array (element 7120). In many embodiments, the digest functions as a filter to allow the logic circuitry to skip loading the full entry from the secondary array in most cases. The array generation logic circuitry may generate the digest based on any function that allows a determination that the full entry will not match the incoming packet. For instance, the function, or process, to generate the digest may be simple and normal to allow software to exploit it. If there is a desire to perform well regardless of software choices, the function, or process, to generate the digest may pick random bits or hash bits or some other function designed to perform well in a variety of conditions.

Once the array generation logic circuitry stores the entries in the primary and secondary arrays, the array generation logic circuitry may determine if there are additional communications from the software application (element 7130). If there are additional communications, the flowchart 7100 begins again at (element 7105). Otherwise, the flowchart 7100 ends or waits for additional communications.

FIG. 8 depicts an embodiment of a table 800 to illustrate data that compares an embodiment of the end-point protocol described herein versus an embodiment of a direct-mapped cache to map incoming packets to memory locations in a host device such the end-point protocol shown in FIGS. 1-7. The table 800 includes a walk length column, a direct-mapped cache column and a series of digest efficiency columns that include digest efficiencies of 50%, 60%, 70%, 80%, and 90%. The walk length column describes the number of entries traversed in the primary array. The direct-mapped cache column describes the average number of cycles of latency required to read full matching criteria from a direct-mapped cache based on the walk length in the first column. The digest efficiency columns include a column to describe the corresponding average latency in cycles based on the walk length in the first column and the efficiency of the digest. The efficiency of the digest describes how efficient the digest is at failing to match headers of incoming packets that do not match the full matching criteria represented by the digest. In other words, the 50% efficiency for the digest indicates that the digest will not match 50% of the incoming packet headers that do not match the full matching criteria associated with the digest and the 90% efficiency for the digest indicates that the digest will not match 90% of the incoming packet headers that do not match the full matching criteria associated with the digest.

The table 800 is based on the following assumptions. Assuming a 7-cycle data read latency, a direct mapped cache requires 7*L cycles to walk the list to find a matching entry that is L elements from the head of the list (assuming no cache misses). And, assuming a list that resides in a cache (i.e., no cache misses), tag match logic circuitry can read a primary array in 3 cycles, tag match logic circuitry can read a data array in 7 cycles, and an N bit digest can filter out $$\sim \left(1 - \frac{1}{2^N}\right)$$

data accesses (i.e., the probability of doing a data access is $$\frac{1}{2^N}),$$

the average list walk requires:

$$3L + 7 + 7(L-1)\left(\frac{1}{2^N}\right) \text{ cycles}$$

Each element requires a three-cycle tag read. The matching element requires a 7-cycle data read. The remaining L−1 items in the list require a 7-cycle data read only if the digest matches. Notably, the latency to hit at the head of the list grows from 7 to 10 cycles, but longer walks realize the gain of skipping the 7-cycle access most of the time. Assuming an N bit digest can filter out $$1 - \frac{1}{2^N}$$

accesses may be optimistic, but a larger digest can compensate to achieve an acceptable efficiency. With an 8-bit to 16-bit digest, good filtering should be achievable.

The longer latency for the hit at the head case should not be a problem for the current implementation because, once the tag match logic circuitry finds the matching entry, the tag match logic circuitry may require approximately 25 cycles to process the packet/matching entry pair. Therefore, performance is essentially limited by max(walk time, 25 cycles). If a walk takes less than 25 cycles, performance may be limited by the packet/entry processing time and if a walk takes more than 25 cycles, performance may be limited by the walk time. With a pipelined cache, the tag match logic circuitry can search several lists simultaneously (i.e., with an average latency of 4 cycles, searching four independent lists issues a new request to the cache every cycle).

Many embodiments enable a set associative cache, which benefits from a lower miss rate and higher utilization than a direct mapped cache, which was the primary motivation as latency grows from 7 cycles for a hit to greater than 100 cycles for a miss. Early performance studies indicated that for our expected workload, the direct mapped cache would start to miss at 70% occupancy. A set associative cache is much more efficient. However, assuming an efficient digest/filter, this mechanism also enables faster walks for longer lists, which is an important real-world case although few industry standard benchmarks measure these workloads. Given the tag and data latencies above, walks that match the third entry in the list take on average less time with a 75% efficient (two bits) digest (19.5 vs 21 cycles). With three bits of digest the crossover point is the second entry of the list (13.875 vs 14 cycles).

As the table gets larger (with higher digest efficiency or longer walks), embodiments may perform increasingly better versus a traditional implementation. Even a 50% digest achieves latency within two cycles at a list length of three and parity at a length of seven. Since the embodiments enable a set associative cache, which will have a lower miss rate, we have a higher probability of completing a search without a cache miss. With 16 bits of digest, efficiencies greater than 95% should be achievable. While we may not be able to improve the latency for a hit at the head of the list, the latency crossover point is approximately a walk length of two for a digest efficiency of 90%.

If entries could be allocated in blocks, it would be possible to read multiple tag/digests for the same list per 3 cycle tag read and therefore improve latency further. However, with a phenomenon of essentially random removal from the list, it might lower cache utilization too much to be valuable. This limits some embodiments but not other embodiments.

Because many embodiments reduce walk time for non-trivial lists, even an implementation that can fully store the data (i.e., one that guarantees no cache misses) can implement a function to generation a digest to accelerate searches with a primary array due to the lower access time of smaller chunks of data. Therefore, the value of many embodiments is not limited to caching implementations. Many embodiments provide latency advantages for implementations that walk any list. The table 800 shows the average latency as a function of digest efficiency for each walk length through 7 entries in the primary array and 7 direct mapped accesses.

Figure 9:
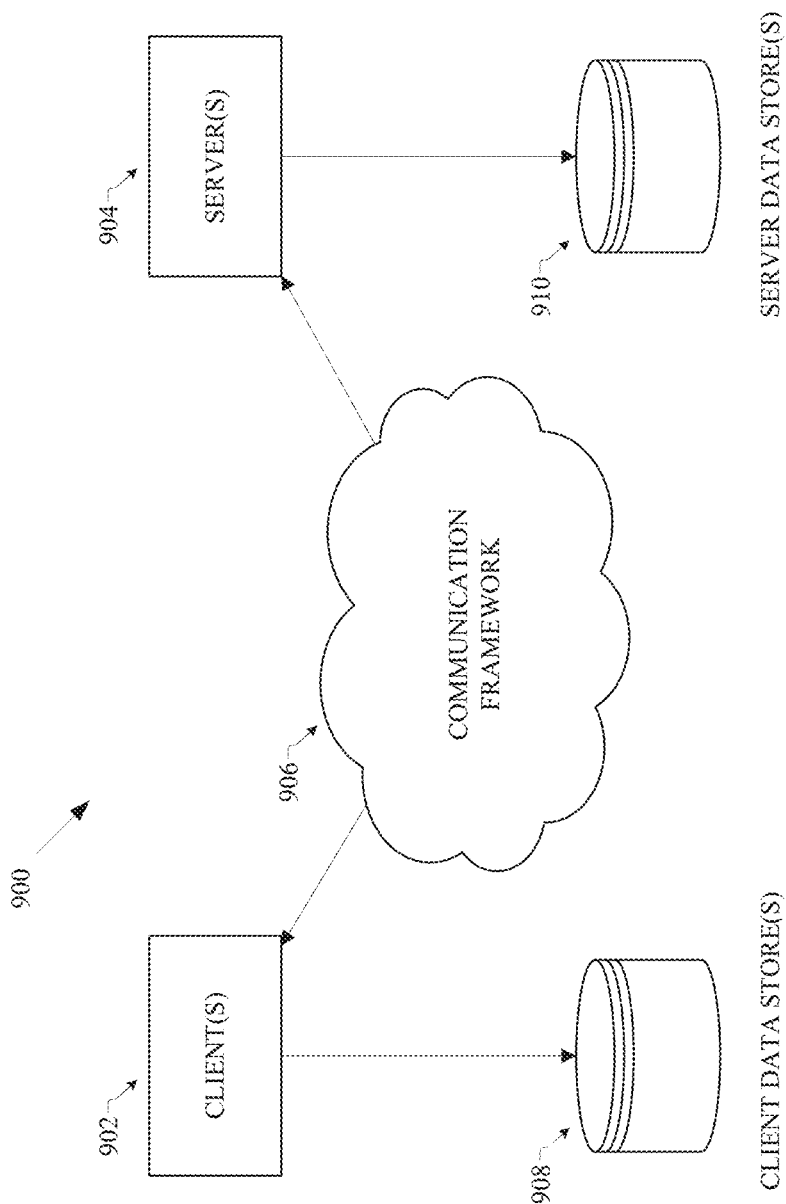
FIG. 9 depicts an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth.

As shown in FIG. 9, the communications architecture 900 comprises includes one or more clients 902 and servers 904. The clients 902 and the servers 904 operatively connect to one or more respective client data stores 908 and server data stores 910 to store information local to the respective clients 902 and servers 904, such as cookies and/or associated contextual information. Any one of clients 902 and/or servers 904 may implement one or more of apparatus 400 and apparatus 450 of FIG. 4, system 6000 of FIG. 6A, flowchart 7000 of FIG. 7A, flowchart 7100 of FIG. 7B, storage medium 1000 of FIG. 10, and computing platform 1100 of FIG. 11. In various embodiments, either or both of apparatuses 400 and 450 of FIG. 4 may comprise one or more switching devices and/or routing devices in the communication framework 906.

The clients 902 and the servers 904 may communicate information between each other using a communication framework 906. The communications framework 906 may implement any well-known communications techniques and protocols. The communications framework 906 may be a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may engage with various communications network types. For example, multiple network interfaces may facilitate communication over broadcast, multicast, and unicast networks. Should processing requirements dictate a greater amount speed and capacity, distributed network controller architectures may pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
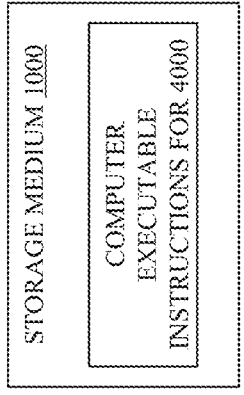
FIGS. 10-11 depicts embodiments of a storage medium and a computing platform of embodiments described herein.

FIG. 10 illustrates an example of a storage medium 1000 to store processor data structures. Storage medium 1000 may comprise an article of manufacture. In some examples, storage medium 1000 may include any non-transitory computer readable medium or machine-readable medium, such as an optical, magnetic or semiconductor storage. Storage medium 1000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 11:
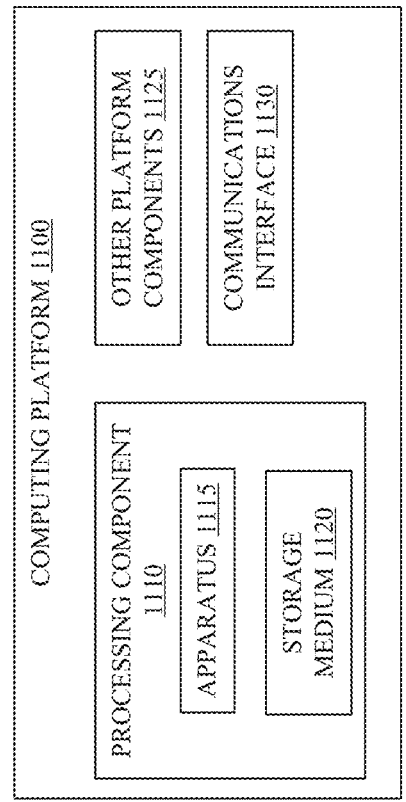

FIG. 11 illustrates an example computing platform 1100 such as the computing devices 102-1 through 102-5 in FIGS. 1-2, apparatuses 400 and 450 in FIG. 4, system 6000 in FIG. 6A. In some examples, as shown in FIG. 11, computing platform 1100 may include a processing component 1110, other platform components or a communications interface 1130. According to some examples, computing platform 1100 may be a computing device such as a server in a system such as a data center or server farm that supports a manager or controller for managing configurable computing resources as mentioned above. Furthermore, the communications interface 1130 may comprise a wake-up radio (WUR) and may be capable of waking up a main radio of the computing platform 1100.

According to some examples, processing component 1110 may execute processing operations or logic for apparatus 1115 described herein. Processing component 1110 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 1120, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 1125 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1130 may include logic and/or features to support a communication interface. For these examples, communications interface 1130 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 1100 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 1100 may include or exclude functions and/or specific configurations of the computing platform 1100 described herein.

The components and features of computing platform 1100 may comprise any combination of discrete circuitry, ASICs, logic gates and/or single chip architectures. Further, the features of computing platform 1100 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, comparing incoming packets to digests in entries of a primary array to determine whether the incoming packets match the digest advantageously reduces the amount of time required and data traffic to determine that an entry does not match the full entry associated with the digest. Retrieving a full entry from the secondary array to compare the full entry with the incoming packet if the first incoming packet matches the digest advantageously reduces the number of comparisons of incoming packets against full entries. Storing at least a portion of the first incoming packet at a first memory location if the first full entry matches the first incoming packet advantageously locates the at least a portion of the incoming packet at a location within the host device that is efficient for a processor of the host device to access. Comparing the incoming packet to subsequent entries in the primary array to identify a full entry in the secondary array that matches the incoming packet in the absence of a match between the incoming packet and the digest or between the incoming packet and the full entry advantageously skips retrieval of the full entry if the digest does not match and begins comparison of the incoming packet to the digest in the next entry in the primary array if the current entry does not match the incoming packet. This process is further advantageous by maintaining the order in which the entries in the primary array were received from the host device. Determining the first digest based on a communication from a host device advantageously reduces the time expended to determine if an incoming packet does not match a full entry in the secondary array in the absence of a match between the incoming packet and the first digest. Determining the first digest based on a communication from a host device may also advantageously adapt the digest to a particular type or sub-type of a communication from the host device or to other data provided by the host device about the incoming packet to increase a probability that a digest will not match an incoming packet that does not match the corresponding full entry in the secondary array and to decrease a probability of a false match, which is when the incoming packet matches the digest in the primary array but does not match the corresponding full entry in the secondary array. Selecting a process to generate the first digest from more than one process, wherein selection of the process is based on the data to identify the first incoming packet advantageously adapts the digest based on data about the incoming packet in a communication from the host device to increase a probability that a digest in the primary array will not match an incoming packet that does not match the corresponding full entry in the secondary array and to decrease a probability of a false match, which is when the incoming packet matches the digest in the primary array but does not match the corresponding full entry in the secondary array. Adding a new entry to an end of the primary array as a linked list element advantageously maintains an order of receipt of communications about incoming packets from the host device to correctly match an incoming packet with the first entry in the primary array and the secondary array, in time order, that matches the incoming packet. Removing the first entry from the primary array after the first entry is matched to the one of the incoming packets advantageously provide space to store another entry, reduces the size of the array that might be traversed in search of an entry in the primary array that matches a subsequent incoming packet, and dynamically amends of the primary array without overhead involved with modifying other forms of data structures.

Examples of Further Embodiments

The following examples pertain to further embodiments. Specifics in the examples may be used anywhere in one or more embodiments.

Example 1 is an apparatus that may comprise: logic circuitry to couple with receive buffers to compare a first incoming packet to a first digest in a first entry of a primary array to determine whether the first incoming packet matches the first digest; when the first incoming packet matches the first digest, the logic circuitry to retrieve a first full entry from a secondary array, the first full entry to correspond to the first entry, and to compare the first full entry with the first incoming packet; when the first full entry matches the first incoming packet, the logic circuitry to store at least a portion of the first incoming packet at a first memory location, wherein entries in the secondary array comprise at least data and a memory location at which to store at least a portion of one of the incoming packets; and in the absence of a match between the first incoming packet and the first digest or between the first incoming packet and the first full entry, the logic circuitry to compare the first incoming packet to subsequent entries in the primary array to identify a full entry in the secondary array that matches the first incoming packet. In Example 2, the apparatus of Example 1, further comprising the receive buffers to comprise the first incoming packet and other incoming packets and cache to comprise the primary array and the secondary array. In Example 3, the apparatus of Example 1, wherein the logic circuitry is configured to compare more than one incoming packets with more than one digests in parallel. In Example 4, the apparatus of Example 1, wherein the logic circuitry is configured to determine the first digest based on a communication from a host device, wherein the communication comprises data to identify the first incoming packet and the first digest comprises a compressed representation of the data to identify the first incoming packet. In Example 5, the apparatus of Example 4, wherein the first digest comprises at least one of combined portions of the data to identify the first incoming packet, selected portions of the data to identify the first incoming packet, a hash of at least a portion of the data to identify the first incoming packet, an encoding of the data to identify the first incoming packet, randomly-selected portions of the data to identify the first incoming packet, and a summary of bits of the data to identify the first incoming packet.

In Example 6, the apparatus of Example 4, the logic circuitry to determine the first digest by selection of a process to generate the first digest from more than one process, wherein selection of the process is based on the data to identify the first incoming packet. In Example 7, the apparatus of Example 1, further comprising link management logic circuitry to add a new entry to an end of the primary array as a linked list element and to remove the first entry from the primary array after the first entry is matched to the one of the incoming packets. In Example 8, the apparatus of Example 1, wherein the logic circuitry is configured to receive communications from a host device to assign memory locations to incoming packets. In Example 9, the apparatus of Example 8, the logic circuitry to couple with memory to store entries in the primary array for each assignment of a memory location, wherein entries in the primary array comprise a tag, a digest, and a next pointer, the digest to represent data in a full entry of the secondary array and the next pointer to identify a subsequent entry in the primary array. In Example 10, the apparatus of Example 8, the first full entry in the secondary array to comprise data to identify at least one of the incoming packets and a memory location at which to store the at least one of the incoming packets. In Example 11, the apparatus of Example 8, the logic circuitry to couple with the memory to store the first full entry in the secondary array of entries. In Example 12, the apparatus of Example 1, wherein the logic circuitry comprises an application specific integrated circuit (ASIC), a general-purpose processor and code, or a specific-purpose processor and code, or a combination thereof. In Example 13, a system to determine a physical resource assignment, the system comprising a memory comprising a dynamic random-access memory coupled with a processor of the compiler logic circuitry in accordance with any one of Examples 1-12.

Example 14 is a method that may comprise: comparing, by a search acceleration logic circuitry, a first incoming packet of the incoming packets to a digest of a first entry in the primary array to determine whether the first incoming packet matches the digest of the first entry; when the first incoming packet matches the digest of the first entry in the primary array, retrieving, by the search acceleration logic circuitry, a first full entry from a secondary array, the first full entry to correspond to the first entry, and comparing the first full entry with the first incoming packet; when the first full entry matches the first incoming packet, storing, by the search acceleration logic circuitry, at least a portion of the first incoming packet at the first memory location; and in the absence of a match between the first incoming packet and the first digest or the first full entry, comparing, by the search acceleration logic circuitry, the first incoming packet to subsequent entries in the primary array of entries and the secondary array of entries to identify a full entry in the secondary array of entries that matches the first incoming packet. In Example 15, the method of Example 14, further comprising: receiving communications to associate incoming packets with memory locations; storing entries for the communications in a primary array, each entry in the primary array comprising a tag, a digest, and a next pointer to identify a subsequent entry in the primary array; and storing entries for the communications in a secondary array, each entry in the secondary array comprising data to identify one of the incoming packets and a memory location of the memory locations that is associated with the one of the incoming packets.

In Example 16, the method of Example 14, further comprising storing the incoming packets in the receive buffers, storing the primary array in a cache, and storing the secondary array in the cache. In Example 17, the method of Example 14, wherein storing the primary array in the cache comprises storing the entries in the primary array as a linked list. In Example 18, the method of Example 14, further comprising comparing a second incoming packet of the incoming packets with the first digest in parallel with comparing the first incoming packet with the first digest. In Example 19, the method of Example 14, wherein determining the first digest based on a communication from the host device comprises combining portions of the data to identify the first incoming packet, selected portions of the data to identify the first incoming packet hashing of at least a portion of the data to identify the first incoming packet, encoding the data to identify the first incoming packet, randomly-selected portions of the data to identify the first incoming packet, a summary of bits of the data to identify the first incoming packet, or a combination thereof. In Example 20, the method of Example 14, wherein determining the first digest based on a communication from the host device comprises selecting a process to generate the first digest from more than one process, wherein selection of the process is based on the data to identify the first incoming packet. In Example 21, the method of Example 14, further comprising adding a new entry to an end of the primary array as a linked list element and removing the first entry from the primary array after the first entry is matched to the one of the incoming packets.

In Example 22, a computer readable medium having stored thereon instructions that when executed cause a computer to perform operations comprising the operations of any one of Examples 14-21. In Example 23, an apparatus to determine a physical resource assignment, the apparatus comprising a means for performing any one of Examples 14-21. In Example 24, a program for causing a computer to perform operations comprising operations of any one of Examples 14-21. In Example 25, a computer-readable storage medium for storing the program of Example 26.

Example 26 is a system that may comprise: a memory; one or more network interface ports coupled with the memory to store incoming packets in the memory; search acceleration logic circuitry coupled with the memory to compare a first incoming packet to a first digest in a first entry of a primary array to determine whether the first incoming packet matches the first digest; when the first incoming packet matches the first digest, the search acceleration logic circuitry to retrieve a first full entry from a secondary array, the first full entry to correspond to the first entry, and to compare the first full entry with the first incoming packet; when the first full entry matches the first incoming packet, the search acceleration logic circuitry to store at least a portion of the first incoming packet at a first memory location, wherein entries in the secondary array comprise at least data and a memory location at which to store at least a portion of one of the incoming packets; and in the absence of a match between the first incoming packet and the first digest or between the first incoming packet and the first full entry, the logic circuitry to compare the first incoming packet to subsequent entries in the primary array to identify a full entry in the secondary array that matches the first incoming packet. In Example 27, the system of Example 26, wherein the search acceleration logic circuitry comprises an application specific integrated circuit (ASIC), a general-purpose processor and code, or a specific-purpose processor and code, or a combination thereof.

In Example 28, the system of Example 26, wherein the memory comprises receive buffers to store incoming packets and cache to store the primary array and the secondary array. In Example 29, the system of Example 28, wherein the search acceleration logic circuitry is configured to receive communications to associate incoming packets with memory locations; store entries for the communications in a primary array, each entry in the primary array comprising a tag, a digest, and a next pointer to identify a subsequent entry in the primary array; and store entries for the communications in a secondary array, each entry in the secondary array comprising data to identify one of the incoming packets and a memory location of the memory locations that is associated with the one of the incoming packets. In Example 30, the system of Example 29, wherein the search acceleration logic circuitry is configured to store the incoming packets in the receive buffers, store the primary array in a cache, and store the secondary array in the cache. In Example 31, the system of Example 29, wherein the search acceleration logic circuitry is configured to add a new entry to an end of the primary array as a linked list element and to remove the first entry from the primary array after the first entry is matched to the one of the incoming packets. In Example 32, the system of Example 29, wherein the search acceleration logic circuitry is configured to perform a matching function for more than one of the incoming packets concurrently. In Example 33, the system of Example 29, wherein the search acceleration logic circuitry is configured to combine portions of the data to identify the first incoming packet, selected portions of the data to identify the first incoming packet, hash at least a portion of the data to identify the first incoming packet, encode the data to identify the first incoming packet, randomly-selected portions of the data to identify the first incoming packet, a summary of bits of the data to identify the first incoming packet, or a combination thereof. In Example 34, the system of Example 29, wherein the search acceleration logic circuitry is configured to select a process to generate the first digest from more than one process, wherein selection of the process is based on the data to identify the first incoming packet.

Example 35 is a non-transitory machine-readable medium containing instructions, which when executed by a processor, cause the processor to perform operations, and the operations may comprise: comparing a first incoming packet of the incoming packets to a digest of a first entry in the primary array to determine whether the first incoming packet matches the digest of the first entry; when the first incoming packet matches the digest of the first entry in the primary array, retrieving a first entry from the secondary array via a tag of the first entry in the primary array and comparing the first full entry with the first incoming packet; when the first full entry matches the first incoming packet, storing at least a portion of the first incoming packet at the first memory location; and in the absence of a match between the first incoming packet and the first digest or the first full entry, comparing the first incoming packet to subsequent entries in the primary array of entries and the secondary array of entries to identify a full entry in the secondary array of entries that matches the first incoming packet. In Example 36, the machine-readable medium of Example 35, wherein the operations further comprise: receiving communications to associate incoming packets with memory locations; storing entries for the communications in a primary array, each entry in the primary array comprising a tag, a digest, and a next pointer to identify a subsequent entry in the primary array; and storing entries for the communications in a secondary array, each entry in the secondary array comprising data to identify one of the incoming packets and a memory location of the memory locations that is associated with the one of the incoming packets. In Example 37, the machine-readable medium of Example 35, wherein the operations further comprise storing the incoming packets in the receive buffers, storing the primary array in a cache, and storing the secondary array in the cache.

In Example 38, the machine-readable medium of Example 35, wherein storing the primary array in the cache comprises storing the entries in the primary array as a linked list. In Example 39, the machine-readable medium of Example 35, wherein the operations further comprise performing a matching function for more than one incoming packets in parallel. In Example 40, the machine-readable medium of Example 35, wherein determining the first digest based on a communication from the host device comprises combining portions of the data to identify the first incoming packet, selected portions of the data to identify the first incoming packet, hashing of at least a portion of the data to identify the first incoming packet, encoding the data to identify the first incoming packet, randomly-selected portions of the data to identify the first incoming packet, summary of bits of the data to identify the first incoming packet, or a combination thereof. In Example 41, the machine-readable medium of Example 35, wherein determining the first digest based on a communication from the host device comprises selecting a process to generate the first digest from more than one process, wherein selection of the process is based on the data to identify the first incoming packet. In Example 42, the machine-readable medium of Example 35, further comprising adding a new entry to an end of the primary array as a linked list element and removing the first entry from the primary array after the first entry is matched to the one of the incoming packets.

Example 43 is an apparatus that may comprise: a means for comparing a first incoming packet of the incoming packets to a digest of a first entry in the primary array to determine whether the first incoming packet matches the digest of the first entry; when the first incoming packet matches the digest of the first entry in the primary array, a means for retrieving a first full entry from a secondary array, the first full entry to correspond to the first entry, and comparing the first full entry with the first incoming packet; when the first full entry matches the first incoming packet, a means for storing at least a portion of the first incoming packet at the first memory location; and in the absence of a match between the first incoming packet and the first digest or the first full entry, a means for comparing the first incoming packet to subsequent entries in the primary array of entries and the secondary array of entries to identify a full entry in the secondary array of entries that matches the first incoming packet. In Example 51, the apparatus of Example 50, further comprising: a means for receiving communications to associate incoming packets with memory locations; a means for storing entries for the communications in a primary array, each entry in the primary array comprising a tag, a digest, and a next pointer to identify a subsequent entry in the primary array; and a means for storing entries for the communications in a secondary array, each entry in the secondary array comprising data to identify one of the incoming packets and a memory location of the memory locations that is associated with the one of the incoming packets.

In Example 52, the apparatus of Example 50, further comprising a means for storing the incoming packets in the receive buffers, storing the primary array in a cache, and storing the secondary array in the cache. In Example 53, the apparatus of Example 50, wherein the means for storing the primary array in the cache comprises a means for storing the entries in the primary array as a linked list. In Example 54, the apparatus of Example 50, further comprising a means for performing a matching function for more than one incoming packets in parallel. In Example 55, the apparatus of Example 50, wherein the means for determining the first digest based on a communication from the host device comprises a means for combining portions of the data to identify the first incoming packet, selected portions of the data to identify the first incoming packet, hashing of at least a portion of the data to identify the first incoming packet, encoding the data to identify the first incoming packet, randomly-selected portions of the data to identify the first incoming packet, summary of bits of the data to identify the first incoming packet, or a combination thereof. In Example 56, the apparatus of Example 50, wherein the means for determining the first digest based on a communication from the host device comprises a means for selecting a process to generate the first digest from more than one process, wherein selection of the process is based on the data to identify the first incoming packet. In Example 57, the apparatus of Example 50, further comprising a means for adding a new entry to an end of the primary array as a linked list element and a means for removing the first entry from the primary array after the first entry is matched to the one of the incoming packets.

What is claimed is:

1. An apparatus, comprising:
   logic circuitry to couple with receive buffers to compare a first incoming packet to a first digest in a first entry of a primary array to determine whether the first incoming packet matches the first digest;
   when the first incoming packet matches the first digest, the logic circuitry to retrieve a first full entry from a secondary array, the first full entry to correspond to the first entry, and to compare the first full entry with the first incoming packet;
   when the first full entry matches the first incoming packet, the logic circuitry to store at least a portion of the first incoming packet at a first memory location, wherein entries in the secondary array comprise at least data and a memory location at which to store at least a portion of one of the incoming packets; and
   in absence of a match between the first incoming packet and the first digest or between the first incoming packet and the first full entry, the logic circuitry to compare the first incoming packet to subsequent entries in the primary array to identify a full entry in the secondary array that matches the first incoming packet.

2. The apparatus of claim 1, further comprising the receive buffers to comprise the first incoming packet and other incoming packets and cache to comprise the primary array and the secondary array.

3. The apparatus of claim 1, wherein the logic circuitry is configured to compare more than one incoming packet with more than one digest in parallel.

4. The apparatus of claim 1, wherein the logic circuitry is configured to determine the first digest based on a communication from a host device, wherein the communication comprises data to identify the first incoming packet and the first digest comprises a compressed representation of the data to identify the first incoming packet.

5. The apparatus of claim 4, wherein the first digest comprises at least one of combined portions of the data to identify the first incoming packet, selected portions of the data to identify the first incoming packet, a hash of at least a portion of the data to identify the first incoming packet, an encoding of the data to identify the first incoming packet, randomly-selected portions of the data to identify the first incoming packet, and a summary of bits of the data to identify the first incoming packet.

6. The apparatus of claim 4, the logic circuitry to determine the first digest by selection of a process to generate the first digest from more than one process, wherein selection of the process is based on the data to identify the first incoming packet.

7. The apparatus of claim 1, wherein the logic circuitry is configured to receive communications from a host device to assign memory locations to incoming packets.

8. The apparatus of claim 7, the logic circuitry to couple with memory to store entries in the primary array for each assignment of a memory location, wherein entries in the primary array comprise a tag, a digest, and a next pointer, the digest to represent data in a full entry of the secondary array and the next pointer to identify a subsequent entry in the primary array.

9. The apparatus of claim 7, the first full entry in the secondary array to comprise data to identify at least one of the incoming packets and a memory location at which to store the at least one of the incoming packets.

10. The apparatus of claim 1, wherein the logic circuitry comprises an application specific integrated circuit (ASIC), a general-purpose processor and code, or a specific-purpose processor and code, or a combination thereof.

11. A method, comprising:
    comparing, by a search acceleration logic circuitry, a first incoming packet of the incoming packets to a digest of a first entry in a primary array to determine whether the first incoming packet matches the digest of the first entry;
    when the first incoming packet matches the digest of the first entry in the primary array, retrieving, by the search acceleration logic circuitry, a first full entry from a secondary array, the first full entry to correspond to the first entry, and comparing the first full entry with the first incoming packet;
    when the first full entry matches the first incoming packet, storing, by the search acceleration logic circuitry, at least a portion of the first incoming packet at a first memory location; and
    in absence of a match between the first incoming packet and the first digest or the first full entry, comparing, by the search acceleration logic circuitry, the first incoming packet to subsequent entries in a primary array of entries and the secondary array of entries to identify a full entry in the secondary array of entries that matches the first incoming packet.

12. The method of claim 11, further comprising:
receiving communications to associate incoming packets with memory locations;
storing entries for the communications in a primary array, each entry in the primary array comprising a tag, a digest, and a next pointer to identify a subsequent entry in the primary array; and
storing entries for the communications in a secondary array, each entry in the secondary array comprising data to identify one of the incoming packets and a memory location of the memory locations that is associated with the one of the incoming packets.

13. The method of claim 11, further comprising storing the incoming packets in receive buffers, storing the primary array in a cache, and storing the secondary array in the cache.

14. The method of claim 11, wherein storing the primary array in a cache comprises storing the entries in the primary array as a linked list, wherein a new entry is added to an end of the primary array as a linked list element and the first entry is removed from the primary array after the first entry is matched to the one of the incoming packets.

15. The method of claim 11, further comprising comparing a second incoming packet of the incoming packets with the first digest in parallel with comparing the first incoming packet with the first digest.

16. A system comprising:
a memory;
one or more network interface ports coupled with the memory to store incoming packets in the memory;
search acceleration logic circuitry coupled with the memory to compare a first incoming packet to a first digest in a first entry of a primary array to determine whether the first incoming packet matches the first digest;
when the first incoming packet matches the first digest, the search acceleration logic circuitry to retrieve a first full entry from a secondary array, the first full entry to correspond to the first entry, and to compare the first full entry with the first incoming packet;
when the first full entry matches the first incoming packet, the search acceleration logic circuitry to store at least a portion of the first incoming packet at a first memory location, wherein entries in the secondary array comprise at least data and a memory location at which to store at least a portion of one of the incoming packets; and
in absence of a match between the first incoming packet and the first digest or between the first incoming packet and the first full entry, the logic circuitry to compare the first incoming packet to subsequent entries in the primary array to identify a full entry in the secondary array that matches the first incoming packet.

17. The system of claim 16, wherein the search acceleration logic circuitry comprises an application specific integrated circuit (ASIC), a general-purpose processor and code, or a specific-purpose processor and code, or a combination thereof.

18. The system of claim 16, wherein the memory comprises receive buffers to store incoming packets and cache to store the primary array and the secondary array.

19. The system of claim 18, wherein the search acceleration logic circuitry is configured to receive communications to associate incoming packets with memory locations; store entries for the communications in the primary array, each entry in the primary array comprising a tag, a digest, and a next pointer to identify a subsequent entry in the primary array; and store entries for the communications in the secondary array, each entry in the secondary array comprising data to identify one of the incoming packets and a memory location of the memory locations that is associated with the one of the incoming packets.

20. The system of claim 19, wherein the search acceleration logic circuitry is configured to store the incoming packets in the receive buffers, store the primary array in a cache, and store the secondary array in the cache.

21. A non-transitory machine-readable medium containing instructions, which when executed by a processor, cause the processor to perform operations, the operations comprising:
comparing a first incoming packet of the incoming packets to a digest of a first entry in a primary array to determine whether the first incoming packet matches the digest of the first entry;
when the first incoming packet matches the digest of the first entry in the primary array, retrieving a first full entry from a secondary array, the first full entry to correspond to the first entry, and comparing the first full entry with the first incoming packet;
when the first full entry matches the first incoming packet, storing at least a portion of the first incoming packet at a first memory location; and
in absence of a match between the first incoming packet and the first digest or the first full entry, comparing the first incoming packet to subsequent entries in the primary array of entries and the secondary array of entries to identify a full entry in the secondary array of entries that matches the first incoming packet.

22. The machine-readable medium of claim 21, wherein the operations further comprise:
receiving communications to associate incoming packets with memory locations;
storing entries for the communications in a primary array, each entry in the primary array comprising a tag, a digest, and a next pointer to identify a subsequent entry in the primary array; and
storing entries for the communications in a secondary array, each entry in the secondary array comprising data to identify one of the incoming packets and a memory location of the memory locations that is associated with the one of the incoming packets.

23. The machine-readable medium of claim 21, wherein the operations further comprise storing the incoming packets in receive buffers, storing the primary array in a cache, and storing the secondary array in the cache.

24. The machine-readable medium of claim 21, wherein storing the primary array in a cache comprises storing the entries in the primary array as a linked list.

25. The machine-readable medium of claim 21, wherein the operations further comprise performing a matching function for more than one incoming packets in parallel.

* * * * *